US007735591B2

(12) United States Patent
Puskar-Pasewicz et al.

(10) Patent No.: US 7,735,591 B2
(45) Date of Patent: Jun. 15, 2010

(54) POWERED WHEELCHAIR HAVING AN ARTICULATING BEAM AND RELATED METHODS OF USE

(75) Inventors: John Puskar-Pasewicz, Shavertown, PA (US); Christopher Grymko, Plains, PA (US)

(73) Assignee: Pride Mobility Products Corporation, Exeter, PA (US)

( * ) Notice: Subject to any disclaimer, the term of this patent is extended or adjusted under 35 U.S.C. 154(b) by 230 days.

(21) Appl. No.: 11/857,323

(22) Filed: Sep. 18, 2007

(65) Prior Publication Data

US 2008/0087481 A1 Apr. 17, 2008

Related U.S. Application Data

(60) Provisional application No. 60/845,642, filed on Sep. 18, 2006.

(51) Int. Cl.
*B60R 16/04* (2006.01)

(52) U.S. Cl. ...................... 180/68.5; 180/907; 180/65.1

(58) Field of Classification Search .................. 180/22, 180/24.02, 209, 8.2, 907, 908, 6.48, 6.5, 180/24.07, 65.51, 68.5; 280/250.1, 755, 280/304.1
See application file for complete search history.

(56) References Cited

U.S. PATENT DOCUMENTS 3,213,957 A 10/1965 Wrigley
3,794,132 A 2/1974 Moon
3,807,520 A 4/1974 Chisholm
3,952,822 A 4/1976 Udden
4,000,912 A 1/1977 Donald et al.
4,128,137 A 12/1978 Booth
4,513,832 A 4/1985 Engman
4,566,551 A 1/1986 Feliz
4,840,394 A 6/1989 Bickler
5,042,607 A 8/1991 Falkenson et al.
5,094,310 A 3/1992 Richey et al.
5,156,226 A 10/1992 Boyer
5,275,248 A 1/1994 Finch
5,435,404 A 7/1995 Garin, III
5,540,297 A 7/1996 Meier
5,564,512 A 10/1996 Scheuderman
5,778,996 A 7/1998 Prior
D397,645 S 9/1998 Schaffner
5,944,131 A 8/1999 Schaffner
5,964,473 A 10/1999 Degonda et al.

(Continued)

FOREIGN PATENT DOCUMENTS

EP 1142548 A2 10/2001

(Continued)

*Primary Examiner*—Paul N Dickson
*Assistant Examiner*—Katy Meyer
(74) *Attorney, Agent, or Firm*—Woodcock Washburn LLP

(57) ABSTRACT

A powered wheelchair includes a frame, a chair, a pair of drive wheels, a pair of rear wheels, and a pair of front wheels. Each front wheel is part of a front arm assembly that is rigidly coupled to a drive via a mounting plate. The mounting plate is connected to the wheelchair frame by a pivot. The drives are transversely mounted. The batteries are disposed rearward of the drives. The rear wheels are part of an articulating beam assembly and are positioned to provide access to the batteries from the rear of the wheelchair with ease.

23 Claims, 40 Drawing Sheets

U.S. PATENT DOCUMENTS

| | | | | |
|---|---|---|---|---|
| 6,129,165 | A | 10/2000 | Schaffner et al. | |
| 6,135,222 | A | 10/2000 | Furukawa | |
| 6,176,335 | B1 | 1/2001 | Schaffner | |
| 6,196,343 | B1 * | 3/2001 | Strautnieks | 180/22 |
| 6,199,647 | B1 | 3/2001 | Schafner | |
| 6,202,773 | B1 | 3/2001 | Richey, II | |
| 6,220,382 | B1 | 4/2001 | Kramer, Jr. | |
| 6,234,507 | B1 | 5/2001 | Dickie | |
| 6,341,657 | B1 | 1/2002 | Hopely, Jr. et al. | |
| 6,375,209 | B1 | 4/2002 | Schlangen | |
| 6,494,474 | B1 | 12/2002 | Kramer, Jr. | |
| 6,554,086 | B1 | 4/2003 | Goertzen et al. | |
| 6,640,916 | B2 | 11/2003 | Schaffner | |
| 6,769,503 | B2 * | 8/2004 | Cheng | 180/68.5 |
| 6,796,568 | B2 | 9/2004 | Martis et al. | |
| 6,923,278 | B2 | 8/2005 | Mulhern | |
| 7,066,290 | B2 * | 6/2006 | Fought | 180/65.51 |
| 7,380,824 | B2 * | 6/2008 | Chen et al. | 280/755 |
| 7,389,835 | B2 | 6/2008 | Mulhern | |
| 7,413,038 | B2 * | 8/2008 | Mulhern et al. | 180/22 |
| 7,506,709 | B2 * | 3/2009 | Kiwak et al. | 180/65.1 |
| 2001/0011613 | A1 | 8/2001 | Schaffner | |
| 2003/0075365 | A1 | 4/2003 | Fought | |
| 2003/0089537 | A1 | 5/2003 | Sinclair | |
| 2004/0251063 | A1 | 12/2004 | Patterson | |
| 2005/0077715 | A1 | 4/2005 | Mulhern | |
| 2006/0022445 | A1 | 2/2006 | Mulhern | |

FOREIGN PATENT DOCUMENTS

| | | | |
|---|---|---|---|
| EP | 1493418 | A1 | 1/2005 |
| EP | 1522294 | A2 | 4/2005 |
| JP | 2001/104391 | | 4/2001 |
| WO | WO 90/06097 | | 6/1990 |
| WO | WO 02/34190 | A2 | 5/2002 |

* cited by examiner

POWERED WHEELCHAIR HAVING AN ARTICULATING BEAM AND RELATED METHODS OF USE

CROSS-REFERENCE TO RELATED APPLICATIONS

This application claims priority under 35 U.S.C. §119(e) to U.S. provisional application No. 60/845,642 filed Sep. 18, 2006, which is incorporated by reference herein in its entirety.

FIELD OF THE INVENTION

The present invention relates to powered wheelchairs, and more specifically to wheelchair configurations having an articulating beam that are capable of assisting in curb-limbing.

BACKGROUND OF THE INVENTION

Powered wheelchairs often have six wheels including a pair of center wheels, a pair of rear wheels, and a pair of front wheels. Typically, one pair of wheels is driven by, and directly connected to, a drive. The front wheels may be suspended above the ground plane on which the wheelchair rests or in contact with the ground. Typically, wheels that are spaced apart from the ground surface, or configured to only lightly contact the ground surface, are fixed except for the capability of turning about their axes of rotation; such wheels are referred to herein as "fixed wheels." Wheels that are configured to ride on the ground surface during normal operation typically have the capability to swivel about a vertical axis; such wheels are referred to herein as "casters."

Wheelchairs that employ fixed wheels often employ springs to suspend the fixed wheels above the ground at the end of forward extending arms. The fixed wheels are the first part of the wheelchair that contact a curb, and the fixed wheels are often configured to ride over a curb.

Wheelchairs that employ casters often are disposed on forward-extending arms that are coupled to the frame at a pivot. Some wheelchairs, such as those employing an Active-Track™ suspension, available on some powered wheelchairs from Pride Mobility Products Corporation, have pivoting front caster arms that raise or are upwardly biased in response to wheelchair acceleration or motor torque to enhance the capability of the wheelchair to climb curbs. Pivotable front caster arms typically employ biasing springs to provide a downward force that is balanced against the drive's capability to raise the casters for ascending a curb and that urges the casters downward to contact the lower ground surface while descending a curb.

Wheelchairs typically have a frame onto which loads from the passenger and the wheelchair's batteries are applied. To properly distribute the load between the center wheels and the rear casters (and where applicable the front casters) and to enhance stability of the wheelchair, loads from the batteries and passenger typically are applied between the axis of rotation of the center wheels and the rear casters, especially where the center wheels are the drive wheels. Often, the batteries are located such that the center of gravity of the batteries is near, but rearward of, the center drive wheels or in general near the center of the wheelchair. To accommodate the battery location, the drive for each drive wheel typically includes a longitudinally oriented (that is, oriented parallel to the axis of straight-ahead movement of the wheelchair) motor and a right-angle gearbox. Additionally, powered wheelchairs have been configured such that a transversely oriented motor splits the battery compartment.

Because the conventional location of the battery compartment is at least partly underneath the passenger chair, the chair must be removed to access the batteries. Accordingly, if the chair must be removed or at least translated, two technicians are needed to change the battery. One technician to assist the passenger and the other to access the battery.

Furthermore, there is a general need for wheelchair configurations that are simple and inexpensive, yet are effective in climbing obstacles such as curbs.

SUMMARY OF THE INVENTION

Wheelchair configurations and corresponding methods of use are provided that have a combination of stability and curb-climbing capabilities. According to a preferred embodiment of the invention , a wheelchair includes a frame; a pair of opposing drive wheels; a pair of pivoting assemblies; and an articulating beam assembly. Each one of the pivoting assemblies includes a drive assembly and a front arm assembly associated with one of the drive wheels, and pivotally connected to the frame. Each drive assembly includes a motor and gearbox that are transversely mounted relative to the frame and operatively coupled to one of the drive wheels. A battery compartment is formed on the frame and is located rearward of the drive assemblies. The articulating beam assembly includes a transverse member, a pair of legs, and a pair of rear wheel assemblies, wherein the legs extend generally rearwardly from opposing ends of the transverse member to the rear wheel assemblies, and the transverse member being pivotally coupled to the frame forward of the batteries allowing the battery compartment to be accessed from the rear of the wheelchair between the legs.

A method of accessing the batteries of this wheelchair includes positioning the articulating beam assembly such that the batteries can be accessed from the rear of the wheelchair between the legs of such articulating beam assembly.

Where applicable above, the front wheel may be a caster that is in contact with the ground while the wheelchair is at rest on a level ground plane or an anti-tip wheel that is suspended from the ground plane. In either case, springs may bias the wheels.

DETAILED DESCRIPTION OF ILLUSTRATIVE EMBODIMENTS

Figure 1:
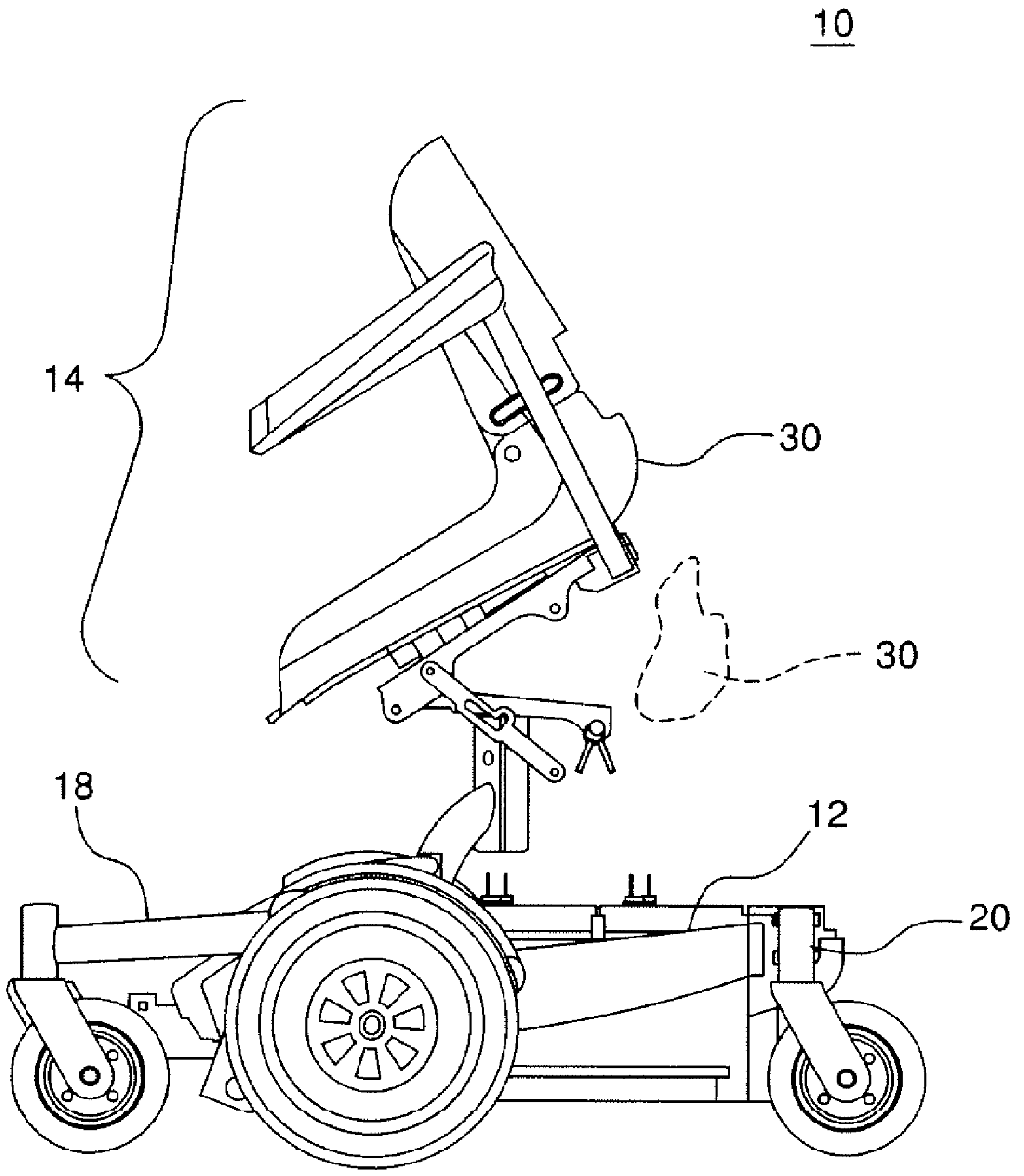
FIG. 1 is a side view of an embodiment of a wheelchair illustrating aspects of the present invention.
Figure 2:
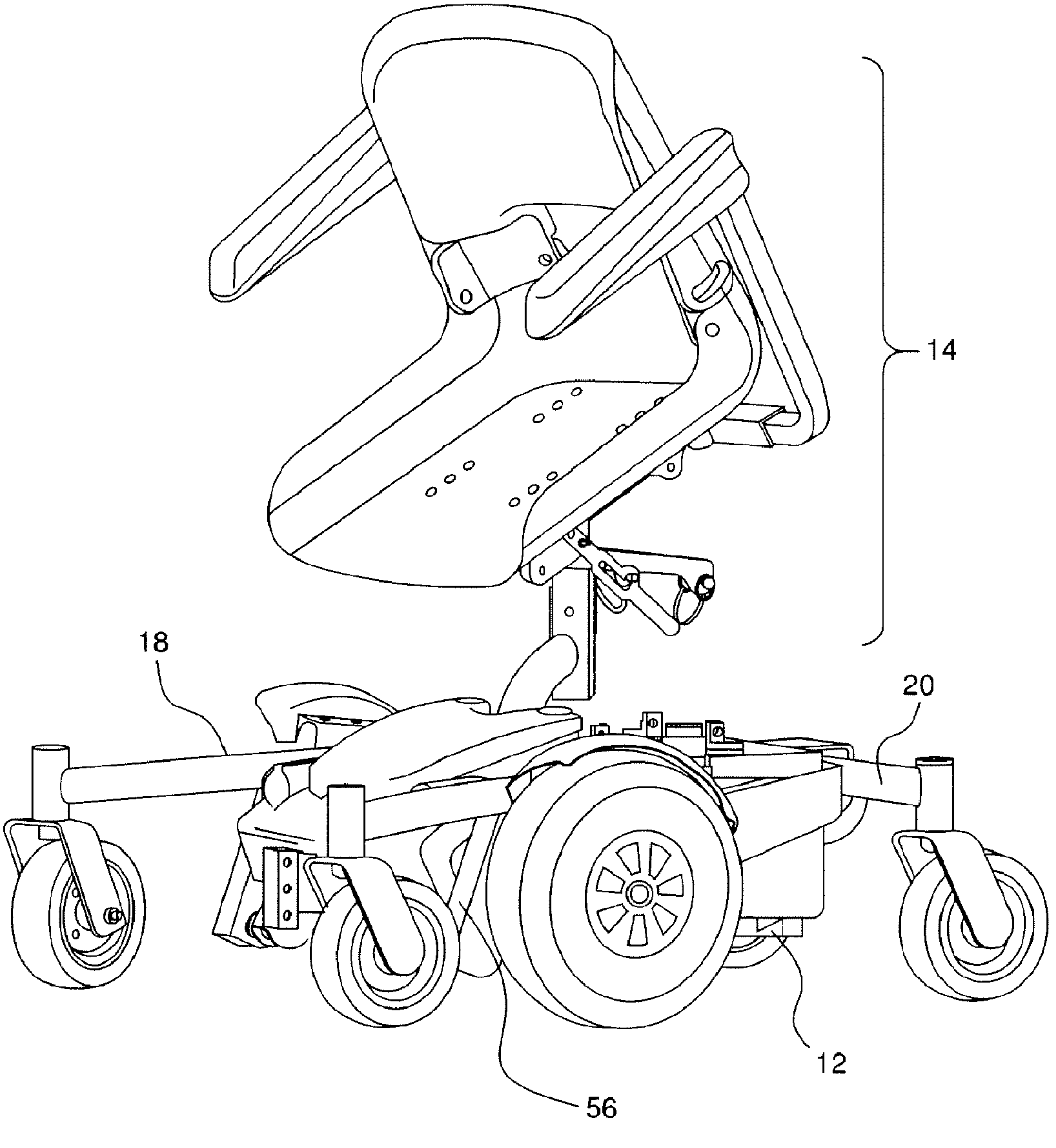
FIG. 2 is a perspective view of the wheelchair shown in FIG. 1.

Several embodiments of a wheelchair are disclosed herein to illustrate aspects of the present invention. A first embodiment wheelchair 10 is shown in FIGS. 1 through 5. Another embodiment wheelchair 10' is shown in FIGS. 7A, 7B, 8A, and 8B. Yet another embodiment wheelchair 310 is shown in FIGS. 24 through 28B. First embodiment wheelchair 10 includes a frame assembly 12, a chair assembly 14, a drive assembly 16, a front pivot assembly 18, and a rear wheel assembly 20.

Frame assembly 12 in the embodiment shown is a box-like structure that is formed of welded and/or bolted square and round tubing and formed plates. The frame structure, which is generally referred to herein by reference numeral 24, includes a central support 25*a*, a rear support 25*b*, a T-shaped support 25*c*, a pair of pivot supports 25*d*, and a footrest support 25*e*. Frame 24 is generally rigid, even though the present invention encompasses frames having joints for enhancing the suspension or any other reason.

Figure 3A:
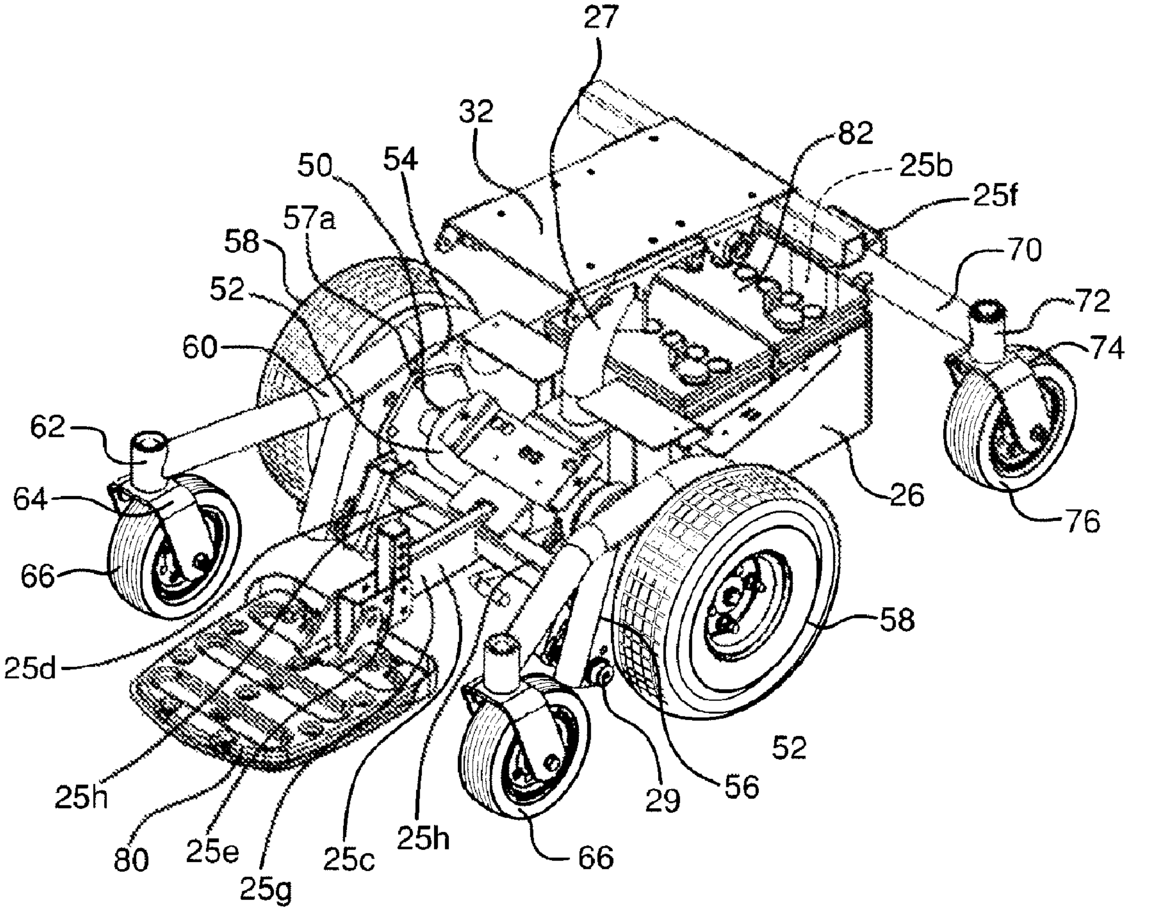
FIG. 3A is a perspective view of the wheelchair shown in FIG. 1 with portions of the chair assembly and cover removed.
Figure 3B:
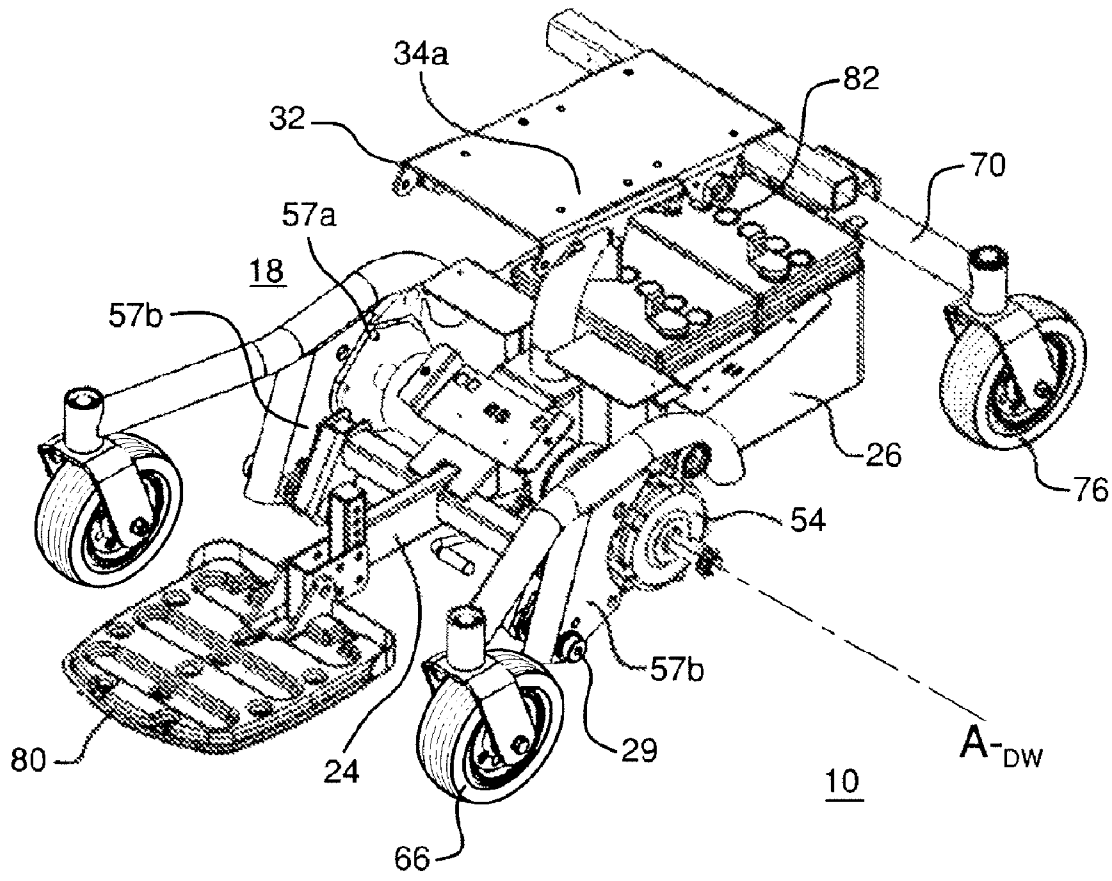
FIG. 3B is a perspective view of the wheelchair as shown in FIG. 3A with the drive wheels and a portion of the mounting plate removed.
Figure 4A:
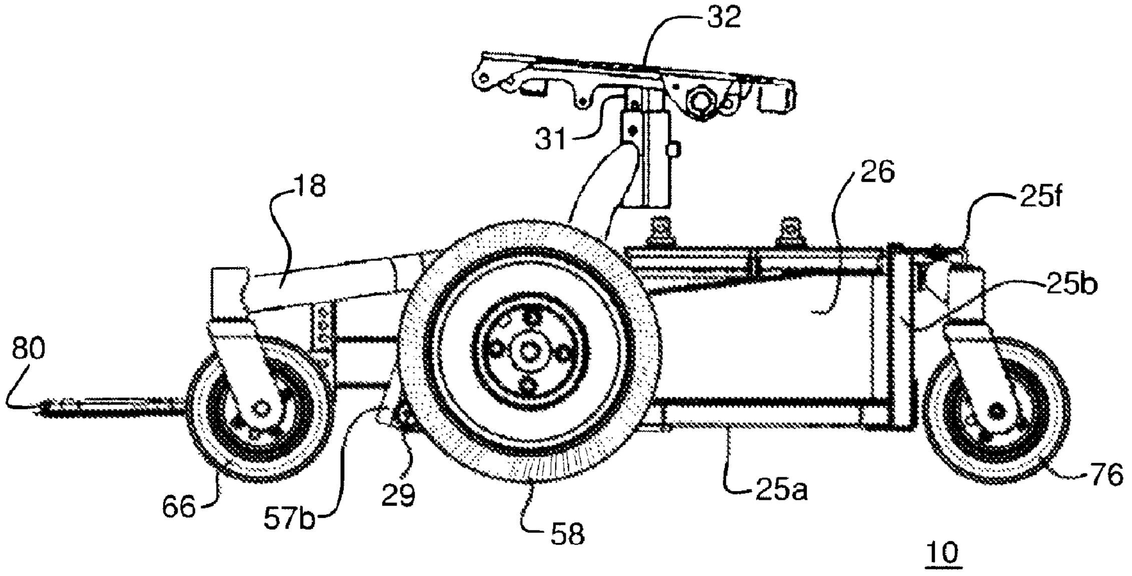
FIG. 4A is a side view of the wheelchair shown in FIG. 1 with portions of the chair assembly and cover removed.
Figure 4B:
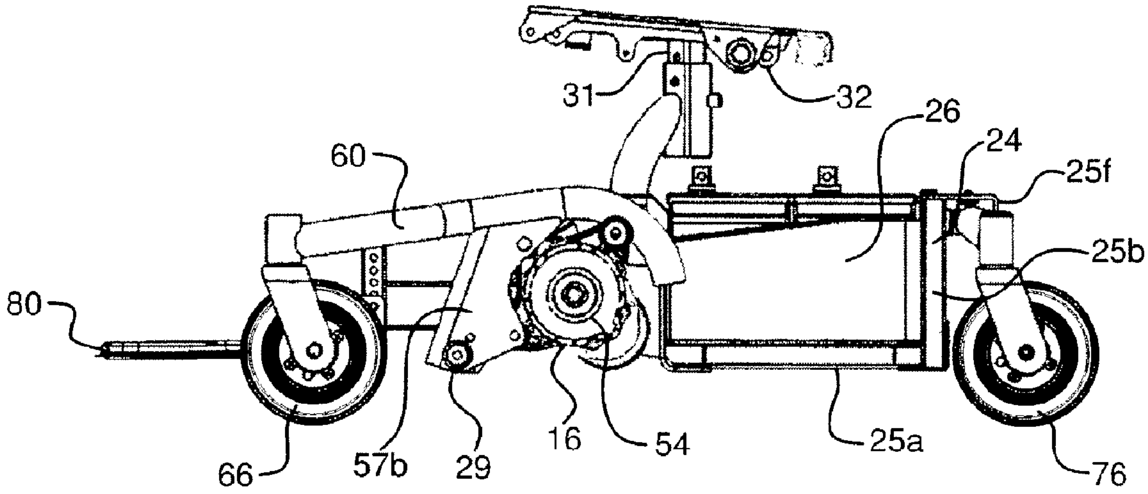
FIG. 4B is side view of the wheelchair as shown in FIG. 4A with the drive wheel and a portion of the mounting plate removed.
Figure 5:
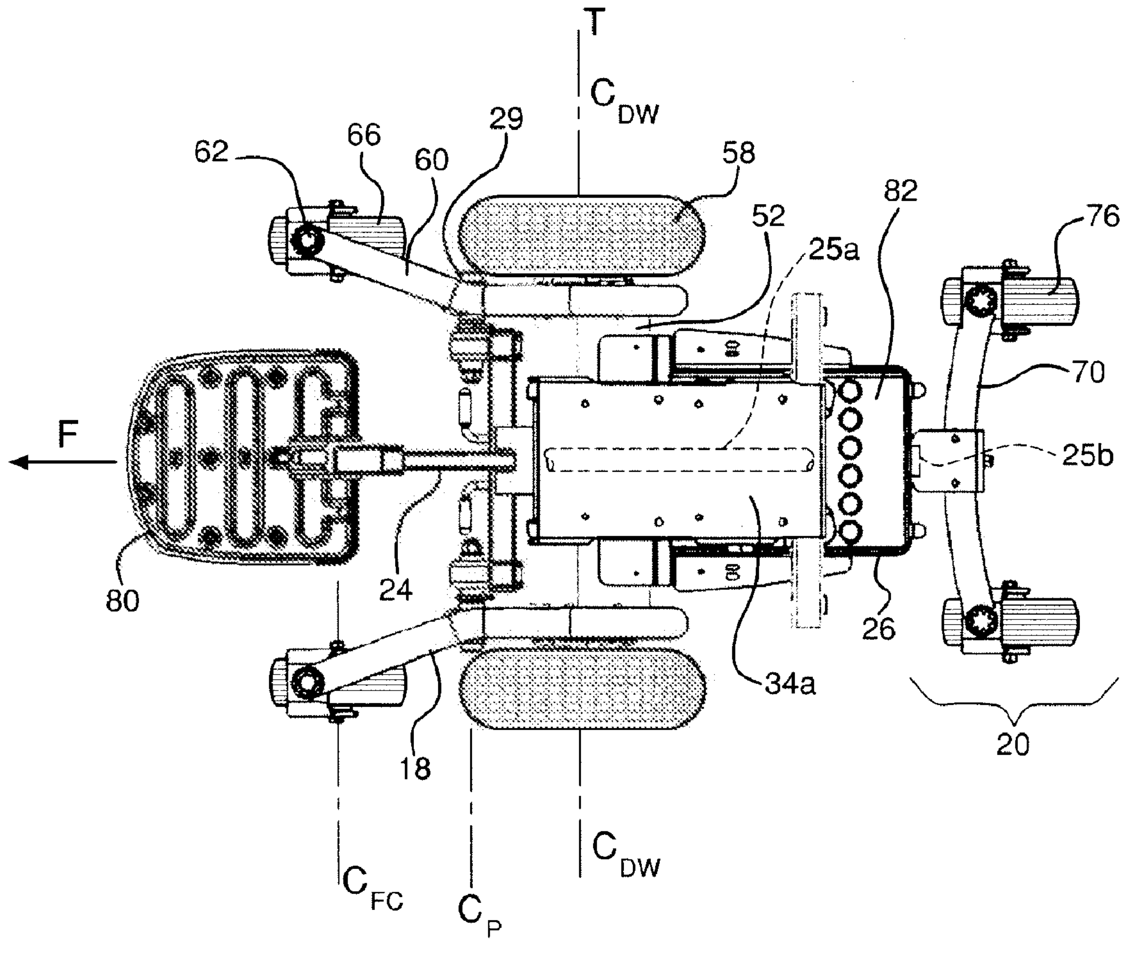
FIG. 5 is a top view of the wheelchair shown in FIG. 1 with portions of the chair assembly and cover removed.

Central support 25*a*, which is best shown in FIGS. 3A, 3B, and 4B, is disposed along a horizontal centerline of the wheelchair 10. Central support is shown in FIGS. 4A and 4B, and partially shown schematically in dashed lines in FIG. 5. Rear support 25*b*, which is shown in FIGS. 4A and 4B, and schematically in dashed lines in FIGS. 3A and 5, extends upwardly from a rear portion of central support 25*a* and includes a mounting plate 25*f*. T-shaped support 25*c* is disposed above and forward of central support 25*a* and includes a longitudinal portion 25*g* and a pair of transverse supports 25*h*. Pivot supports 25*d* extend generally downwardly from transverse supports 25*h*. Footrest support 25*e* is disposed at a forward end of longitudinal portion 25*b* of T-shaped support 25*c*. A footrest 80 is coupled to footrest support 25*e*.

Figure 6A:
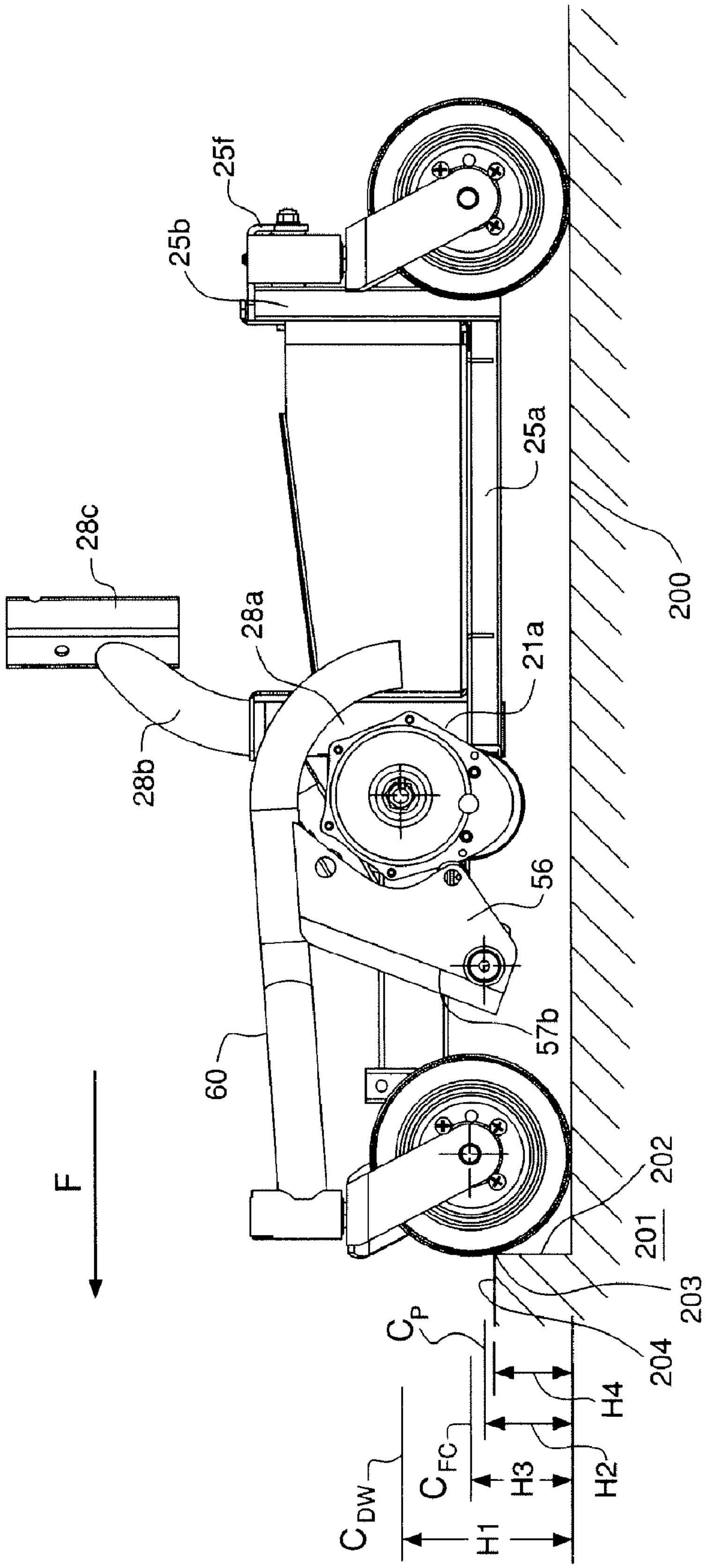
FIG. 6A is a side view of the wheelchair shown in FIG. 1 on a level ground surface with the cover, drive wheel, and a portion of the mounting plate removed.

A housing 26 for holding batteries 82 or other power source is bolted or welded to frame 24. A chair support, such as support post 27, extends upwardly from frame 24. Support post 27 may be integrally formed as a portion of frame 24 or may be a separate structure. Support post 27, as best shown in FIG. 6A, includes a substantially upright portion 28*a*, a backwardly curved portion 28*b*, and an upright square tube 28*c*.

Figure 11:
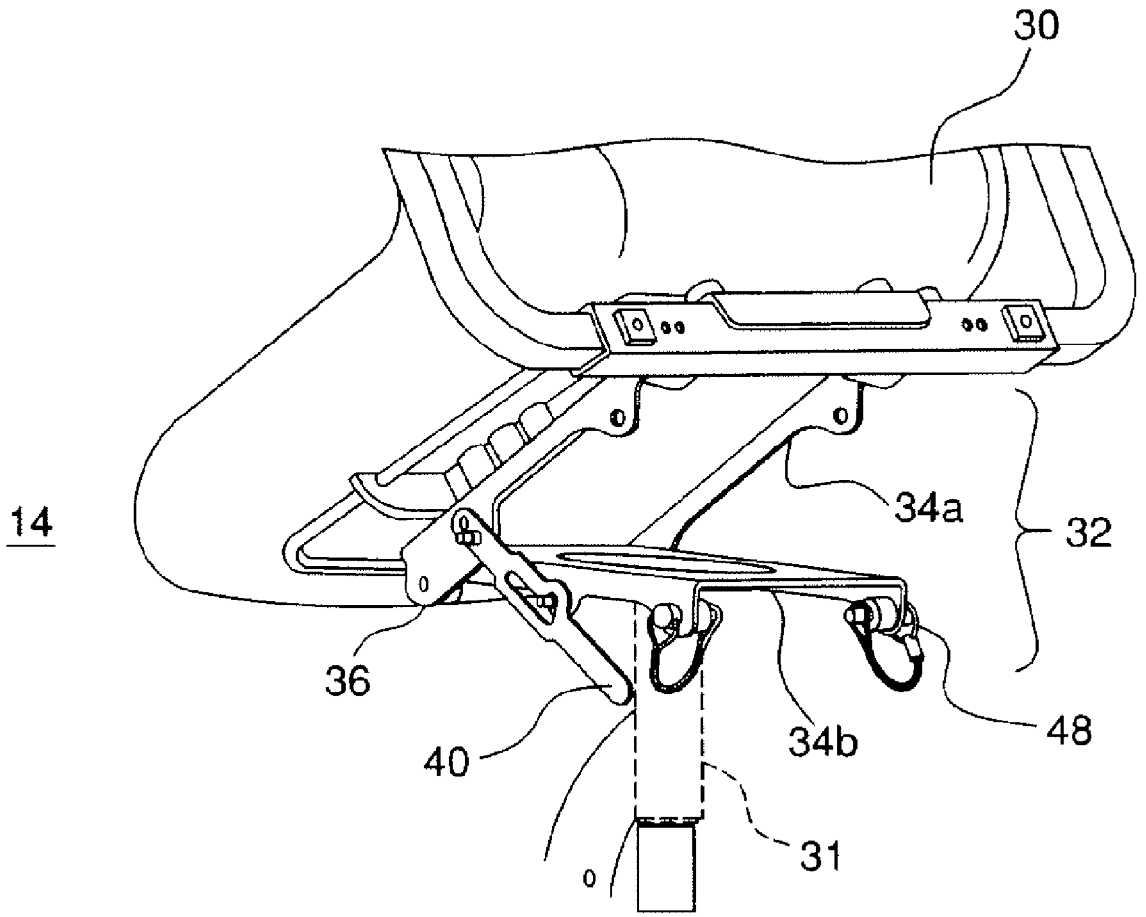
FIG. 11 is a perspective view of a portion of the chair assembly showing the chair in its forward-most position.
Figure 12:
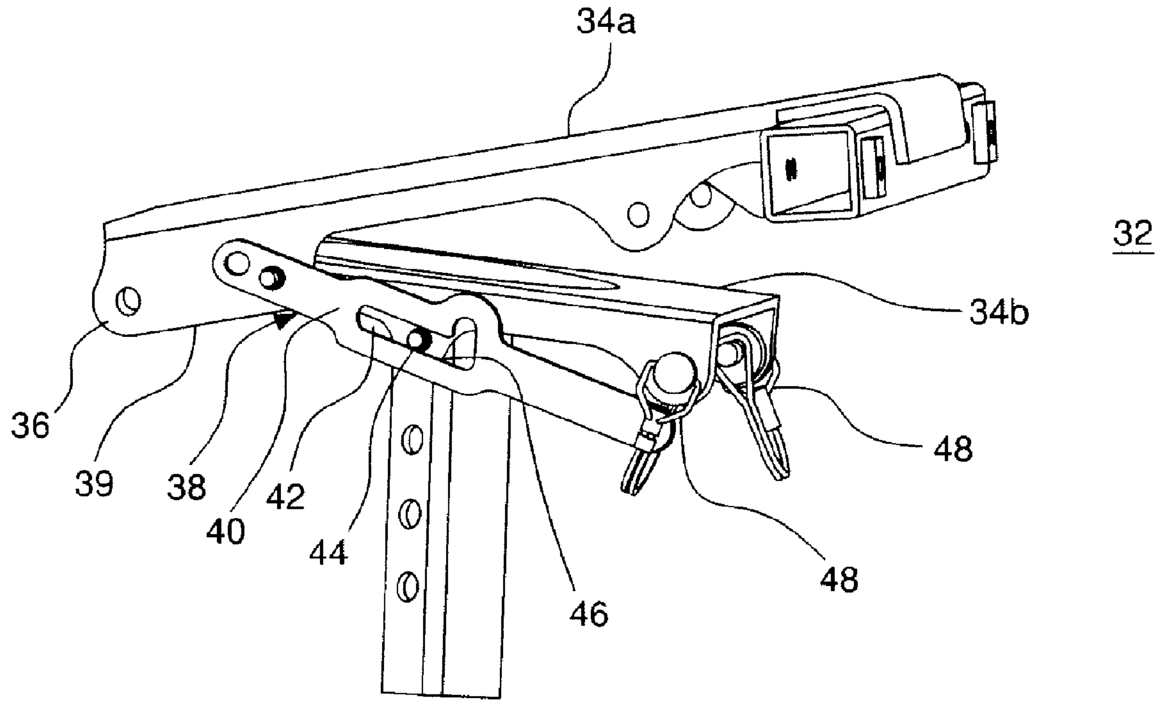
FIG. 12 is a perspective view of a moveable portion of the chair assembly corresponding to the chair being in an intermediate position.
Figure 13:
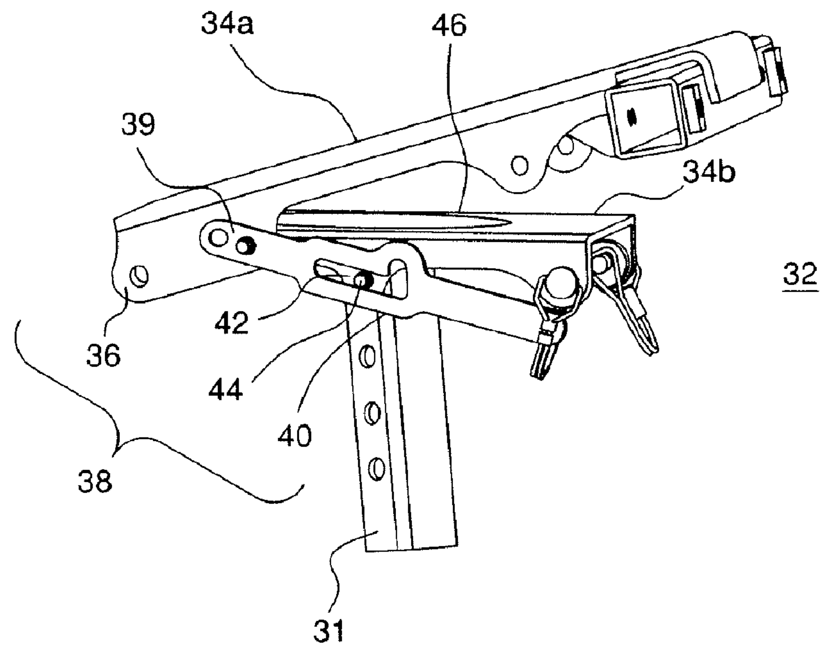
FIG. 13 is a perspective view of the moveable portion of the chair assembly corresponding to the chair being in its forward-most position.

Chair assembly 14 includes a seat 30 for holding the wheelchair passenger, a seat post 31 for insertion into tube 28*c* of support post 27, and a hinge assembly 32 for enabling the seat 30 to pivot forward. Hinge assembly 32 enables seat 30 to pivot relative to seat post 31. As best shown in FIG. 11 through FIG. 13, hinge assembly 32 includes a pair of plates or brackets 34*a* and 34*b*, and a hinge or pivot 36.

To retain the seat in its forward-most position, which is shown in FIG. 11 and FIG. 13, a retainer assembly 38 includes a retainer plate 40 having a slot 42, a stud 44, and a detent recess 46. Retainer plate 40 preferably is attached to upper bracket 34*a* by a pivot 39. Stud 44 preferably is affixed to lower bracket 34*b* and disposed to slide within slot 42. Detent recess 46 is formed in retainer plate 40 as an extension of slot 42. Stud 44 can slide into the recess 46 to temporarily and releasably lock seat 30 in its forward-most position. This locking mechanism can be released by moving the retainer plate 40 by hand such that stud 44 is disposed into the long slotted portion of slot 42, which enables stud 44 to slide in slot 42 to enable seat 30 to return to its ready position for use by a passenger The ready position is shown schematically in dashed lines in FIG. 1. A pair of pins 48 are provided for manually locking brackets 34*a* and 34*b* together to prevent seat 30 from pivoting forward and keep seat 30 in its ready position.

Figure 15:
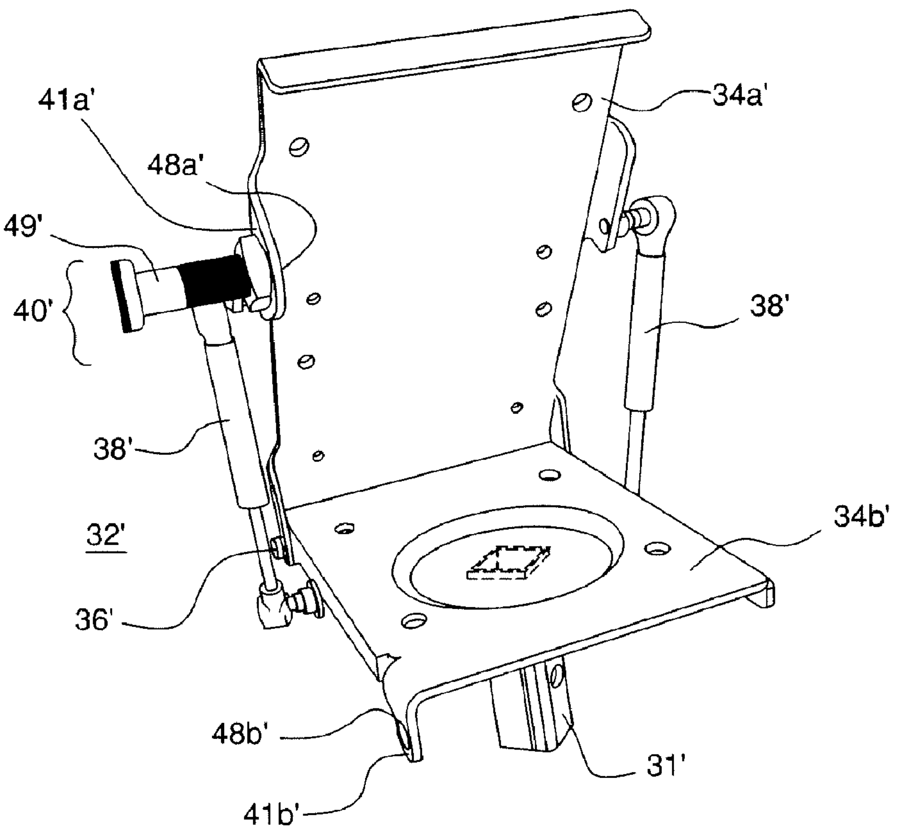
FIG. 15 is a perspective view of the embodiment shown in FIG. 14 showing the chair in a forward-most position.
Figure 14:
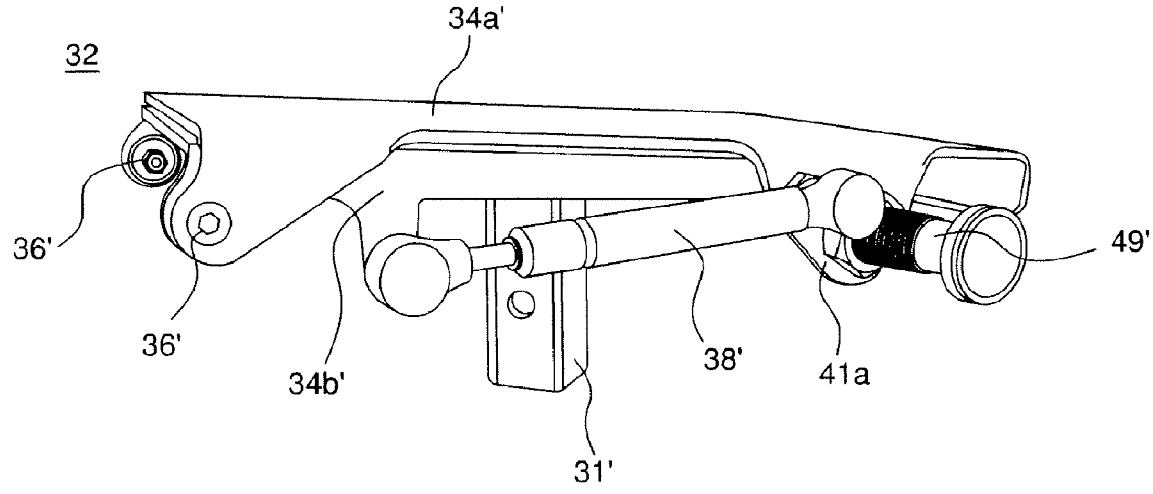
FIG. 14 is a perspective view of another embodiment of a moveable portion of the chair assembly shown in a lower or operational position.

Referring to FIGS. 14 and 15 to illustrate another assembly to enable a seat 30 (not shown in FIGS. 14 and 15 for convenience of illustration) to move forward, a hinge assembly 32' is coupled to a seat post 31'. Hinge assembly 32' includes an upper mounting plate or bracket 34*a*' and a lower mounting plate or bracket 34*b*'. Plates 34*a*' and 34*b*' are connected at front portions thereof by a hinge or pivot 36'. A pair of gas or spring-loaded cylinders 38', which are biased toward the extended position, are connected between the two plates to urge upper bracket 34*b*' toward its forward-most position, as shown in FIG. 15. Preferably, cylinders 38' provide enough force to retain seat 30 in its forward position such that a person can by hand lower seat 30 against the force of cylinders 38'. Also, cylinders 38' are oriented and chosen such that force tending move chair 30 from its lowermost position does not create a personnel risk. In general, cylinders 38' preferably assist in the raising of chair 30.

A latch mechanism 40' holds lower bracket 34*b*' in its rearward-most or lower-most position, in which upper bracket 34*a*' rests on lower bracket 34*b*', and is coupled to an ear or flange 41*a*' on upper plate 34*a*'. The lower-most position is shown in FIG. 14. Latch mechanism 40' includes a retractable pin 48*a*', which preferably may be spring loaded or, alternatively, retractable by threading onto threads fixed onto one of the brackets. As best shown in FIG. 15, pin 48*a*' is housed in a body 49', which is affixed to an ear or flange 41*a*' that extends from upper bracket 34*a*'. Body 49' preferably is threaded onto a nut that is affixed to flange 41*a'*.

Lower bracket 34*b*' includes connections for cylinders 38', a connection for seat post 31', and a downwardly projecting ear or flange 41*b*'. Flange 41*b*' preferably has a curved portion that forms a smooth transition between a substantially vertical portion of flange 41*b*' and the major surface of bracket 34*b*'. Thus, when upper bracket 34*a*' is lowered onto lower bracket 34*b*', pin 48*a*' contacts the curved portion of flange 41*a*' and gradually retracts. Pin 48*a*' aligns with a hole 48*b*' formed in flange 41*a*' when upper bracket 34*a*' is fully engaged with lower bracket 34*b*'. Pin 48*a*' then extends into hole 48*b*' to retain upper bracket 34*b*' onto lower bracket 34*a'*.

Figure 16:
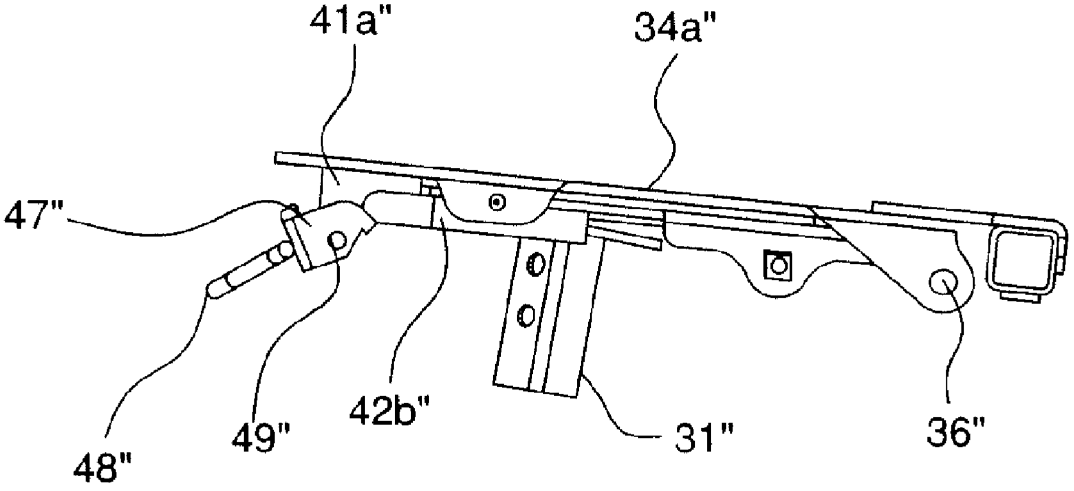
FIG. 16 is a side view of another embodiment of a moveable portion of the chair assembly shown in its lower or operational position.
Figure 17:
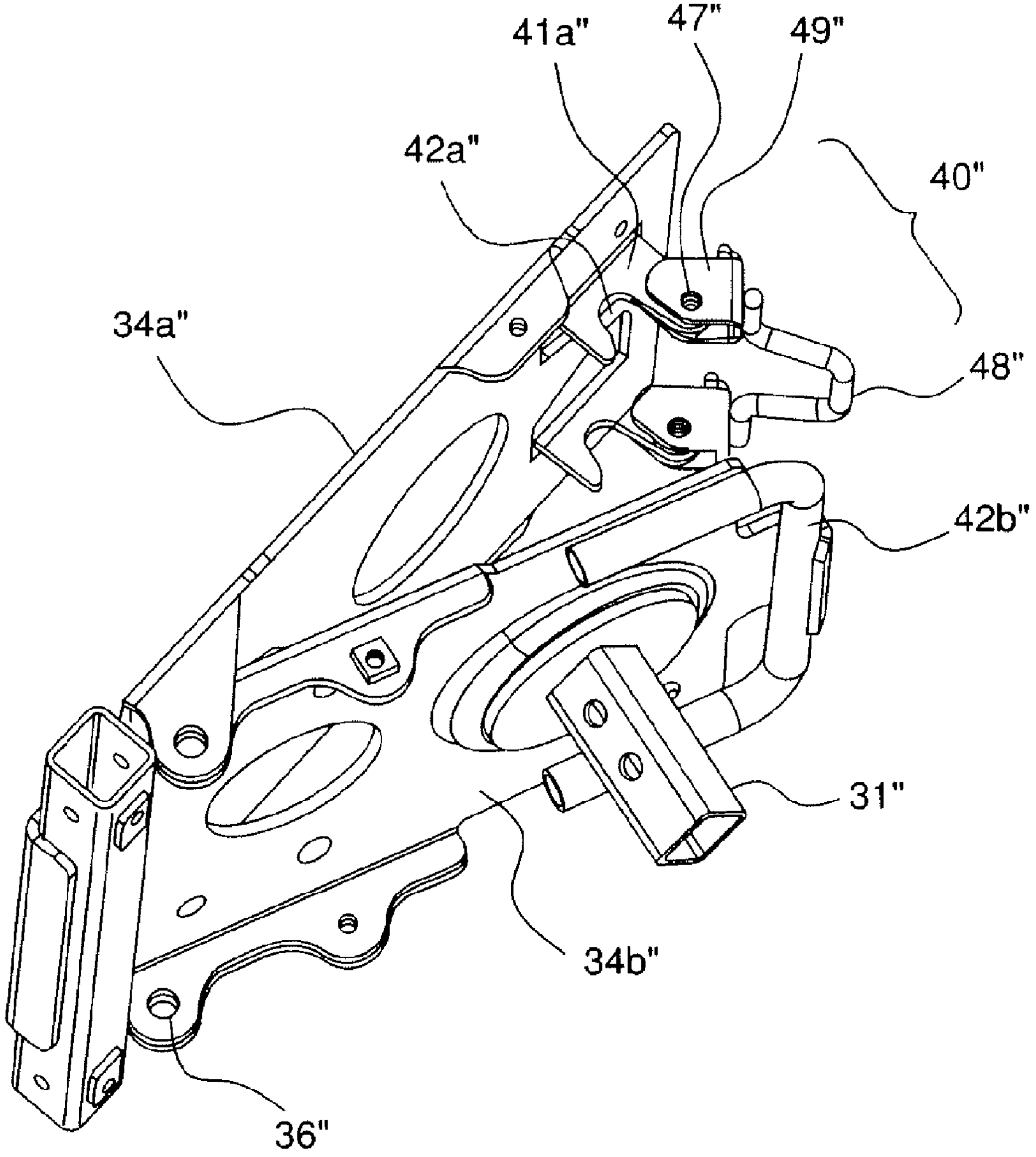
FIG. 17 is a perspective view of the underside of the embodiment shown in FIG. 16, but shown in its open configuration that corresponds to the chairs' forward-most position.

FIGS. 16 and 17 show an alternative embodiment of the assembly that enables seat 30 (not shown in FIGS. 17 and 17 for clarity) to move foreword. The brackets 34*a*" and 34*b*" of the embodiment of FIGS. 16 and 17 are similar to those shown in FIGS. 14 and 15 except latch mechanism 40' (and its cooperating structure) is omitted in favor of a locking handle 40" (and its cooperating structure) that is employed to retain upper bracket 34*a*" and lower bracket 34*b*" together. In this regard, upper bracket 34*a*" includes a pair of tabs 41*a*" that form a slot 42*a*". In its lower position, slot 42*a*" receives an alignment bar 42*b*" that is part of lower bracket 34*b*". Brackets 34*a*" and 34*b*" are coupled together by a hinge or pivot 36".

Locking handle 40" includes a handle portion 48" and a pair of cam portions 49" that are connected to tabs 41*a*" via a hinge 47". In the lower position, shown in FIG. 16, can portions 49" engage alignment bar 42*b*" to retain brackets 34*a*" and 34*b*" together. Upward rotation of handle mechanism 40" disengages cam portions 49" from alignment bar 42*b*" and enables upper bracket 34*a*" to move upward relative to lower bracket 34*b*". Preferably, air cylinders, as shown in FIGS. 14 and 15 (not shown in FIGS. 16 and 17), are connected between brackets 34*a*" and 34*b*" to urge seat 30 toward its forward-most position (or more preferably to aid in the manual raising of seat 30 toward its forward-most position), and to retain it in the forward-most position, until manually returned to its lower position.

Figure 18:
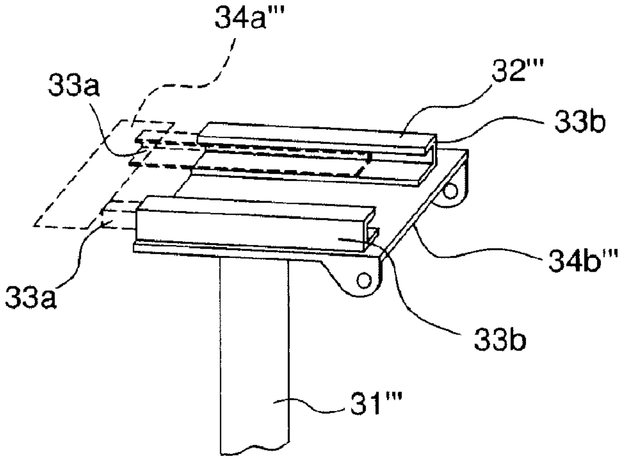
FIG. 18 is a perspective view of another embodiment of a moveable portion of the chair assembly.

Referring to FIG. 18 to illustrate another embodiment of an assembly to enable a seat 30 to move forward, a slide assembly 32''' is mounted onto a lower chair assembly bracket 34*b*'''. A corresponding upper chair assembly bracket 34*a*''', which is shown schematically in dashed lines, is rigidly coupled to a chair 30 (not shown in FIG. 18). A pair of slides enables upper bracket 34*a*''' to slide on lower bracket 34*b*''', which is affixed to a support 31. Support post 27''' is generally identical to post 27 described above.

Each one of the pair of slides includes a slide member 33*a* that is fixed to the upper bracket 34*a*''' and a cooperating slide member 33*b* that is fixed to the lower bracket 34*b*'''. Slide members 33*a* and 33*b* may have any configuration that will enable seat 30 to slide relative to lower bracket 34*b*''', including conventional slides.

According to a first embodiment wheelchair 10 as illustrated beginning at FIG. 3A, a wheelchair 10 includes a pair of drive assemblies 16 and pivot assemblies 18. Preferably, the left combination of drive assembly 16 and pivot assembly 18 is the mirror image of the right combination of drive assembly 16 and pivot assembly 18. For convenience, only one of each assembly drive 16 and pivot assembly 18 is described in detail herein, as it is clear that the description applies equally to each one of the left and right assemblies 16 and 18.

Drive assembly 16 includes a pair of drives 50, each of which includes a motor 52, a gearbox 54, and a mounting plate 56. Each one of the drive assemblies is connected to one of a pair of drive wheels 58. Drive assembly 16 is pivotally coupled to frame assembly 12 by the pivot 29 between frame structure 24 and mounting plate 56. Motor 52 preferably is oriented with its centerline (that is, the central axis of its output shaft) parallel to the output shaft of gearbox 54, which is coupled to a drive wheel 58 as shown in the figures. A longitudinal centerline of the output shaft of gearbox 54, which preferably is a single reduction gearbox, is collinear with the drive wheel rotational axis, which is designated C-DW. Motor 52 may be oriented such that its centerline is collinear with or—as shown in the figures—is parallel to, but offset from, drive wheel rotational axis C-DW and the output shaft of gearbox 54.

Drives 50 preferably are mounted transverse to the direction of translation of the wheelchair. As illustrated by arrow F shown for example in FIG. 6A, the direction of translation is parallel to a ground plane surface 200 on which the wheelchair moves forward and perpendicular to the rotational axis C-DW of the drive wheels. The transverse axis is parallel to the axis of rotation of the drive wheels and parallel to the level ground. As used herein, the orientation of rotational or pivotal axes are based on the wheelchair at rest on level ground surface 200 with all wheels oriented to roll straight forward (direction F). Also, the present invention encompasses motors 52 having a centerline (that is, the central axis of its output shaft) that is not parallel to the drive wheel rotational axis C-DW. The present invention (that is, as recited in a claim) is not limited to any relationship or orientation of any part of the drive relative to the frame unless such relationship or orientation is explicitly stated in the claim.

Drive 50 is rigidly affixed to mounting plate 56. Mounting plate 56 preferably is planar and oriented perpendicular to rotational axis C-DW of drive wheels 58. As best shown in FIGS. 3A, 3B, 4A, and 4B, mounting plate 56 includes a mounting portion 57*a* to which drive 50 is coupled and a projection 57*b* that extends forward and downward. Preferably, gearbox 54 is bolted onto mounting portion 57*a*. Projection 57*b* houses a portion of a pivot 29 for pivotally connecting mounting plate 56 to pivot support 25*d* of frame 24.

Figure 19:
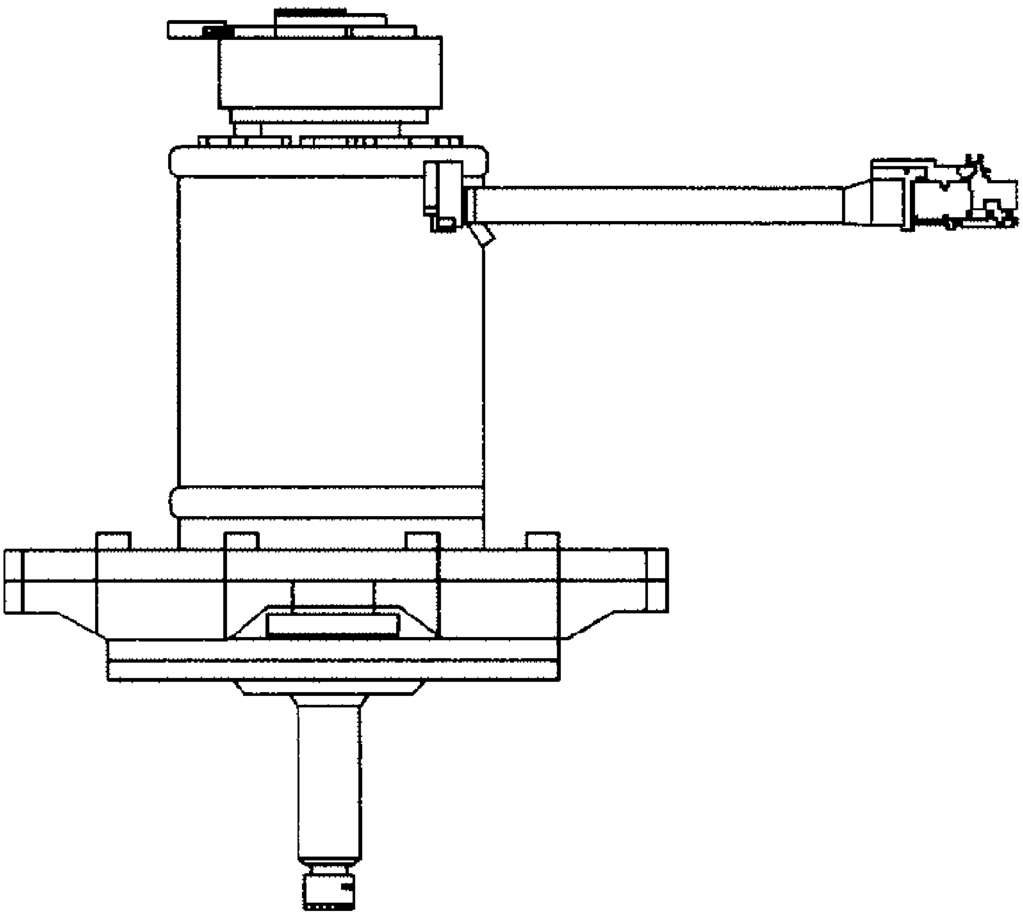
FIG. 19 is a view of the preferred drive.
Figure 20:
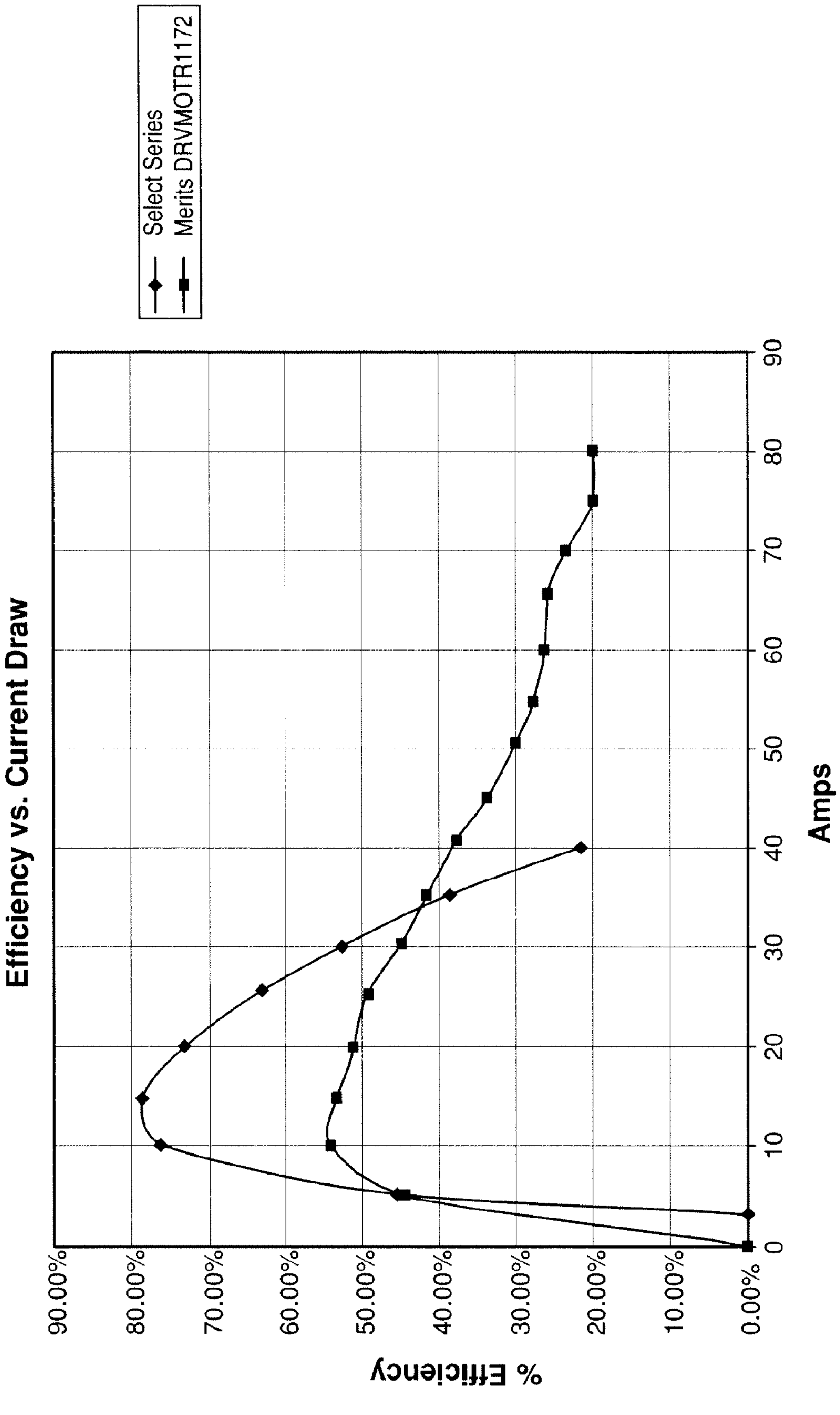
FIG. 20 is a graph of output efficiency versus current draw for a preferred drive and a conventional drive.
Figure 21:
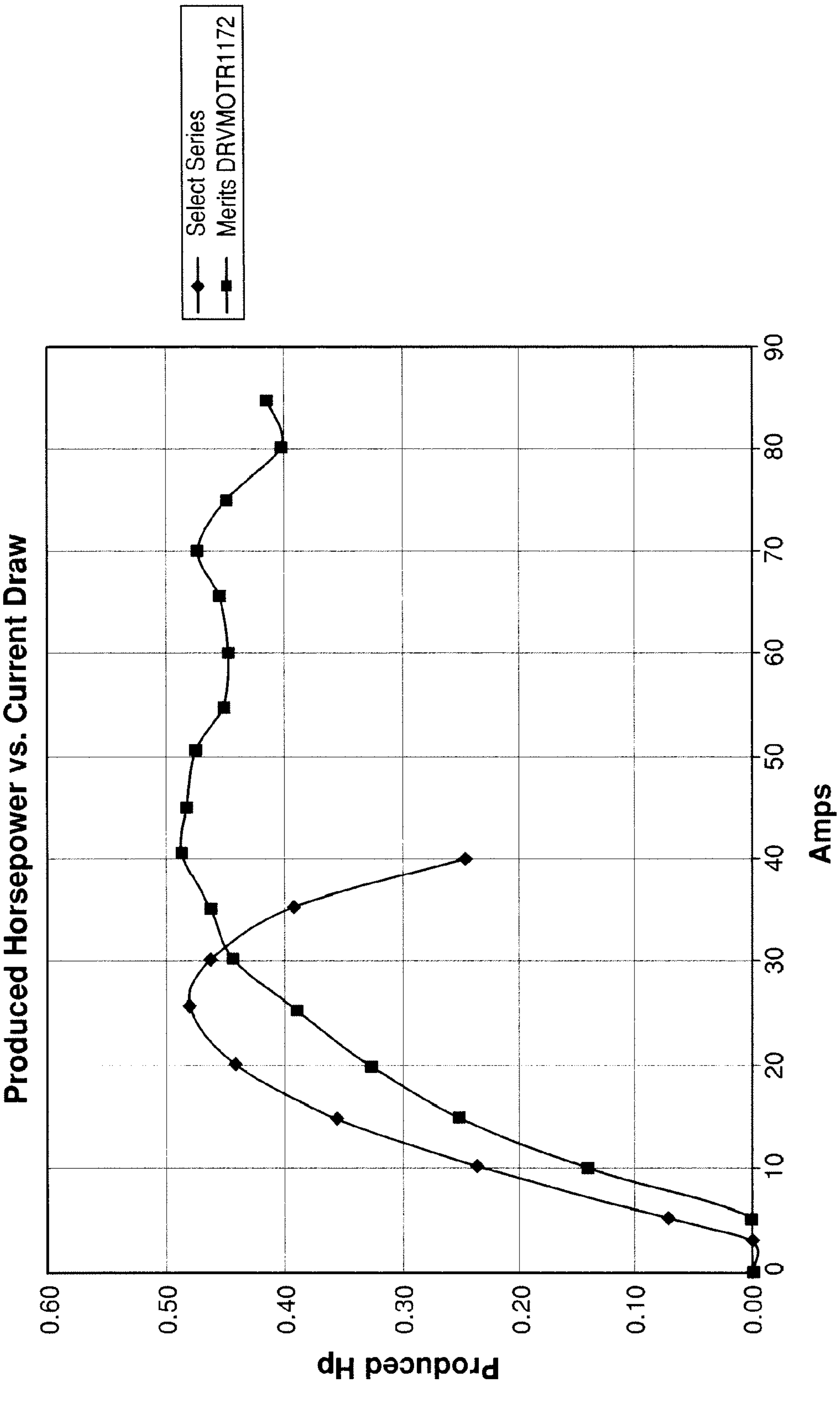
FIG. 21 is graph of output horsepower versus current draw for a preferred drive and a conventional drive.
Figure 22:
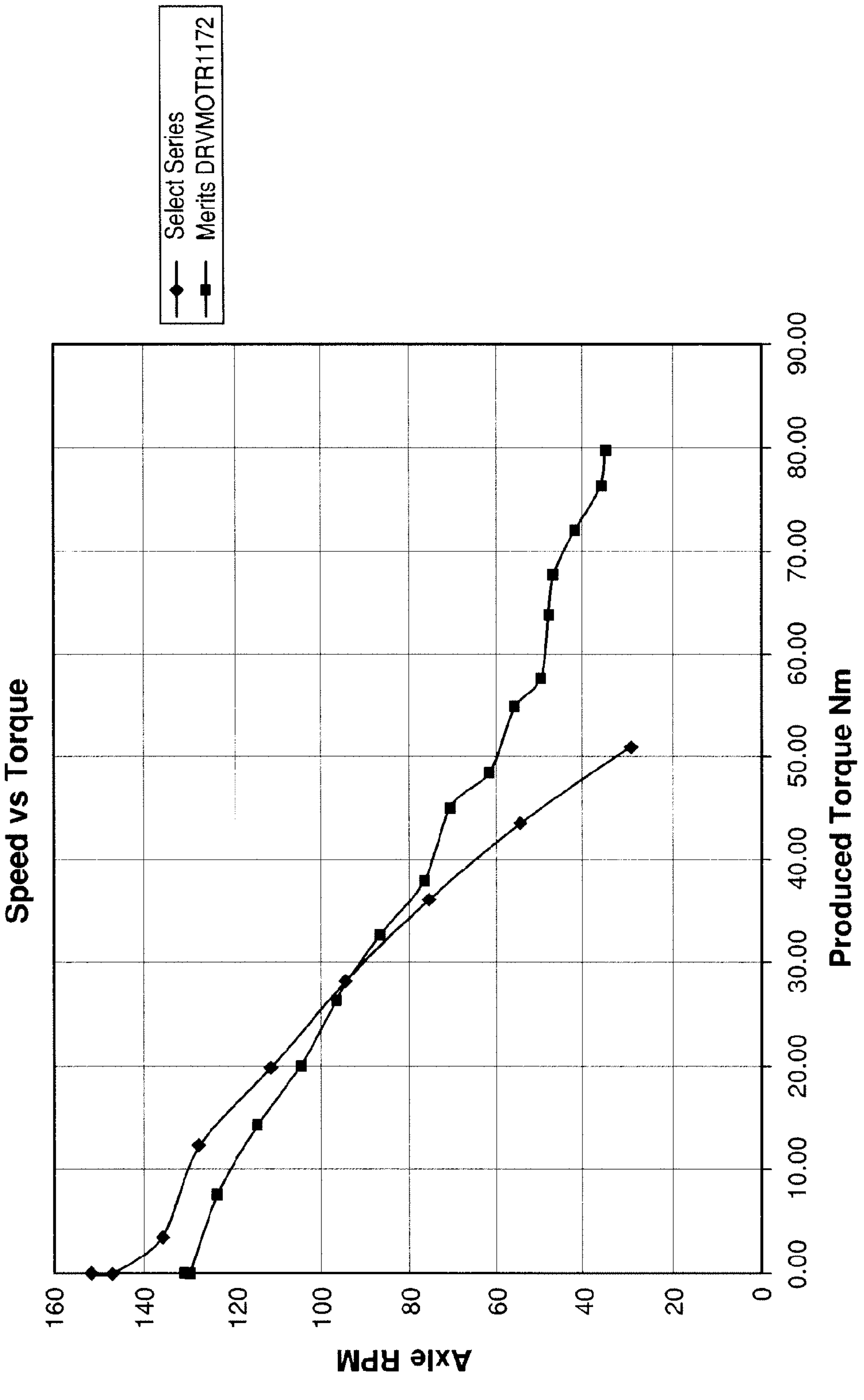
FIG. 22 is a graph of output speed versus torque for a preferred drive and a conventional drive.
Figure 23:
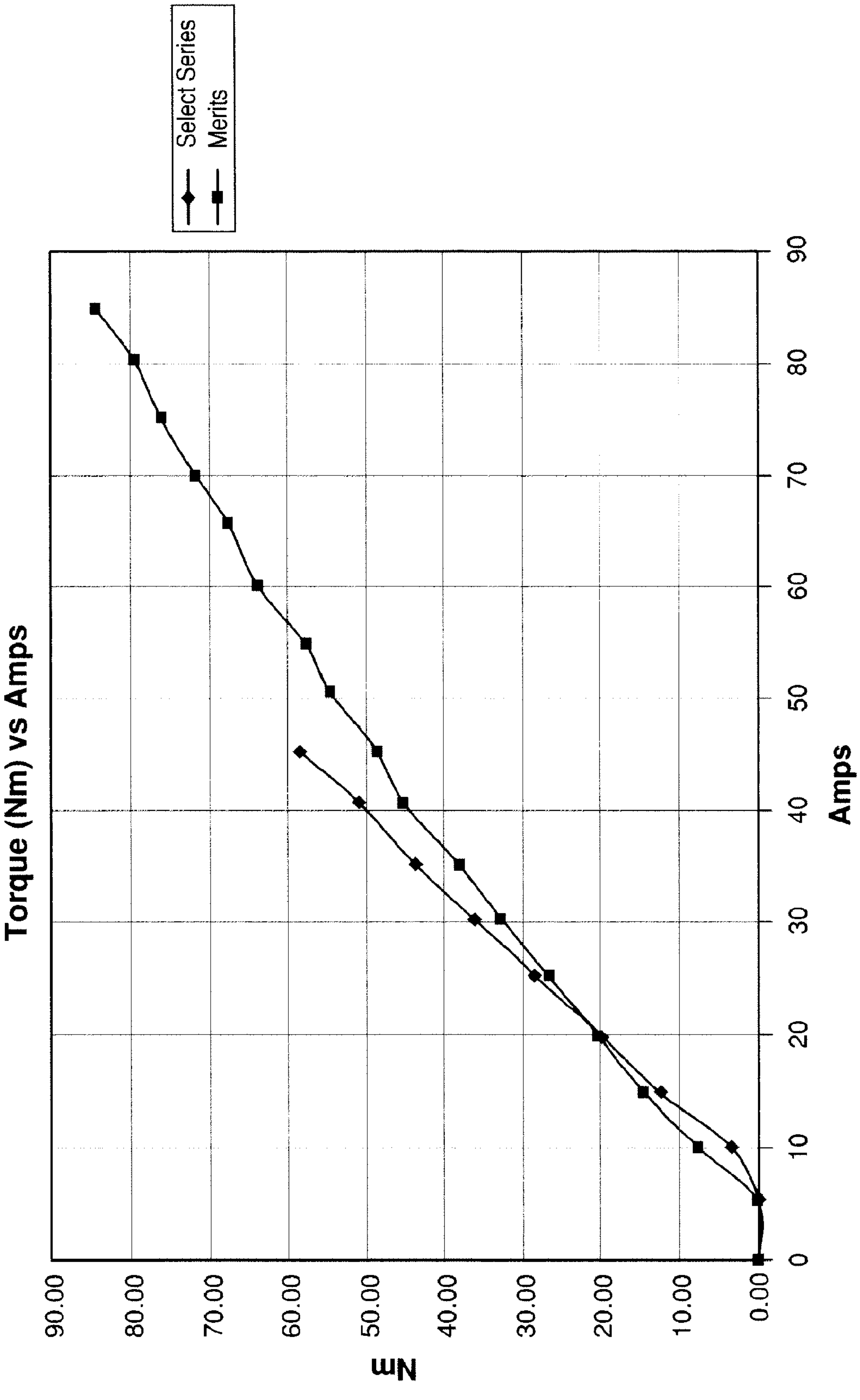
FIG. 23 is a graph of output torque versus current draw for a preferred drive and a conventional drive.
Figure 24:
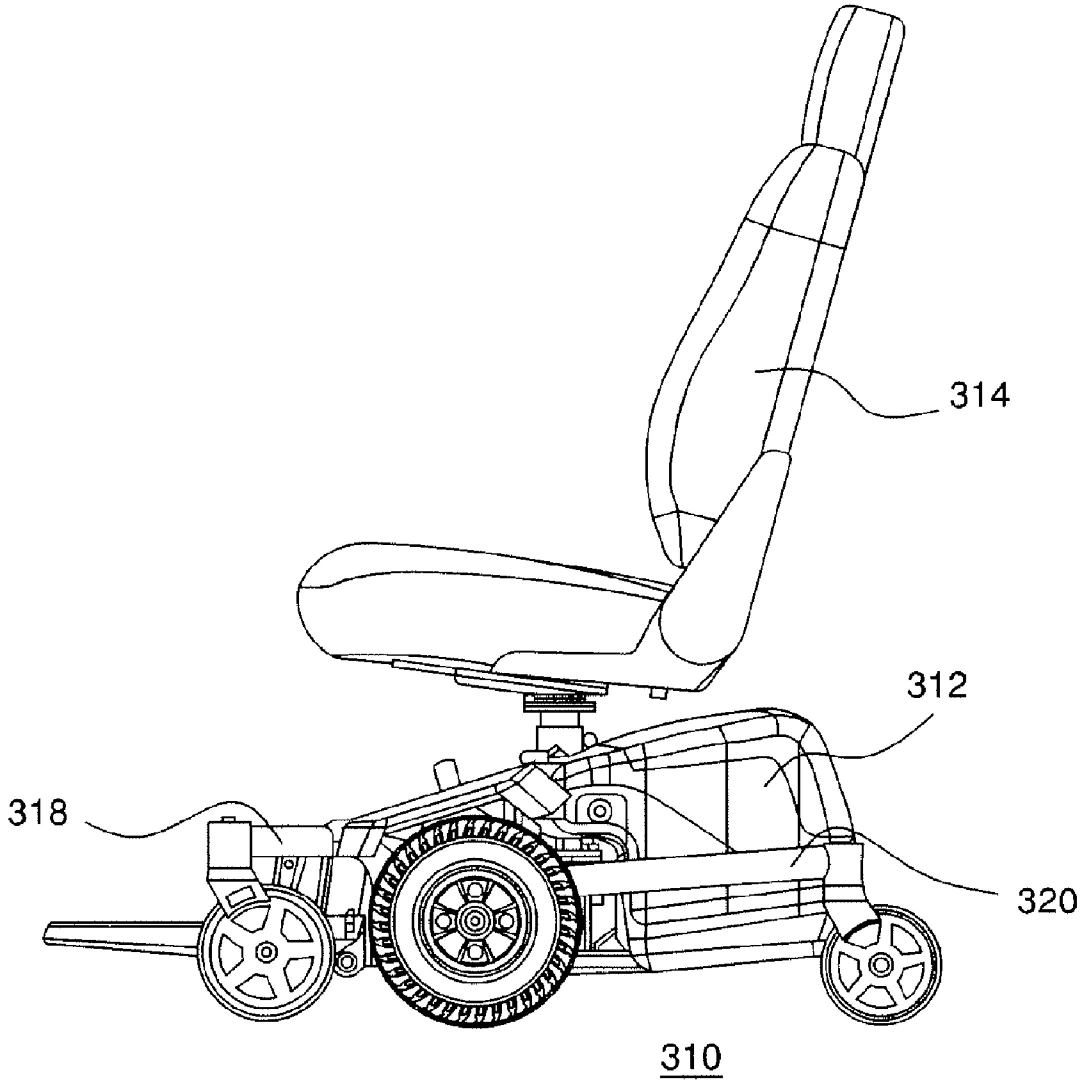
FIG. 24 is a side view of another embodiment of a wheelchair illustrating aspects of the present invention.
Figure 25:
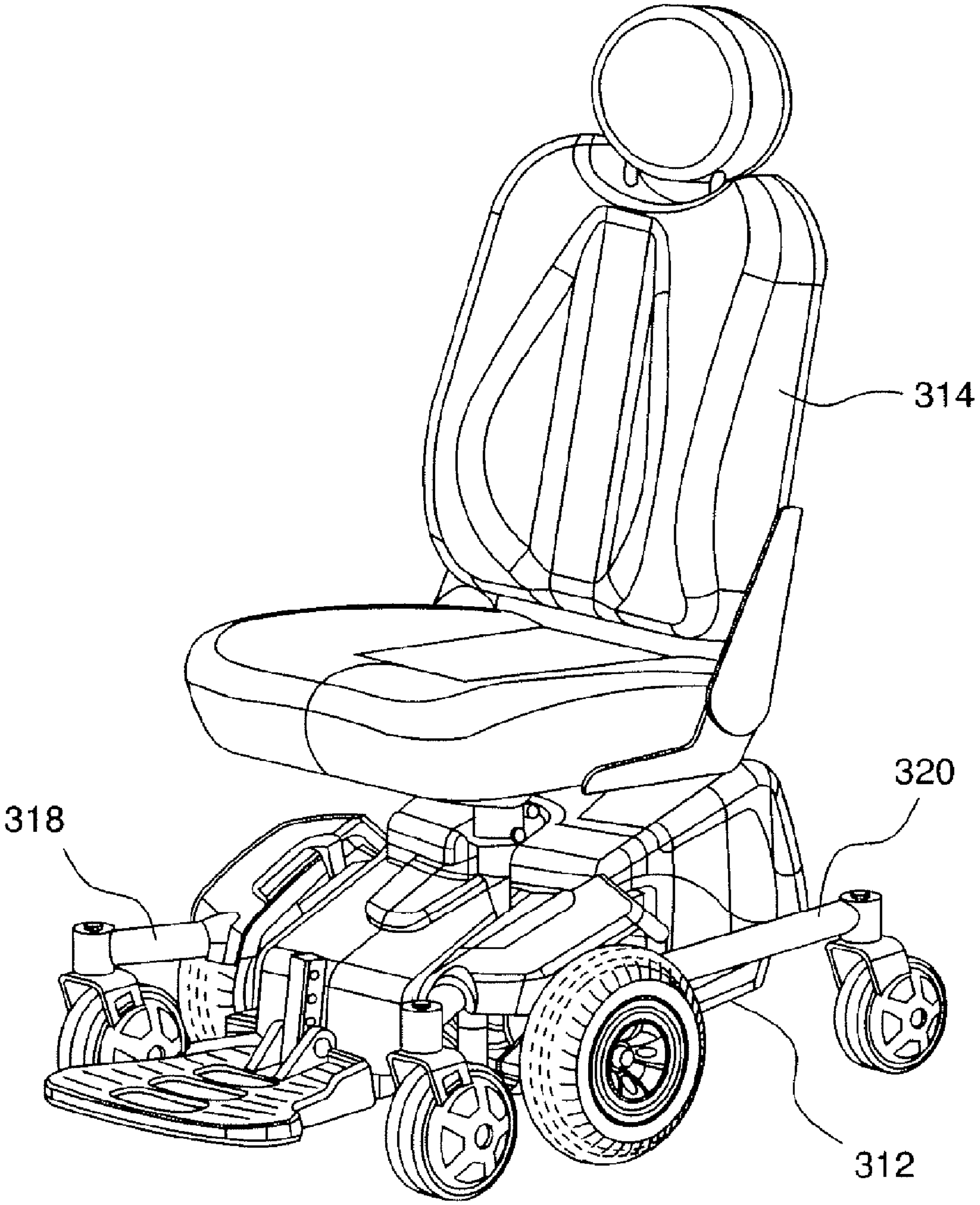
FIG. 25 is a perspective view of the wheelchair shown in FIG. 24.

The configuration of drive 50 aids in locating and configuring battery compartment 26, but is not required generally to obtain other benefits of the inventive aspects of wheelchair 10. And the term "battery compartment" encompasses not only enclosures for housing the batteries but also volumes (even if unenclosed) in which the batteries for powering the motors resides. The configuration of drives 50 also provides improvement in efficiency compared with conventional right angle drives. Preferably drive 50, which is shown in FIG. 19, includes a 24 volt DC motor rated for 3.0 amps and a single reduction gearbox having a reduction ratio of 17.75:1. The no-load speed rating is 166 rpm. FIGS. 20 through 23 illustrate some benefits of preferred drive 50 compared with a conventional worm-gear, right angle drive having a 4500 rpm motor rated for 2.1 amps (at no load) and a 32:1 gear ratio. FIG. 20 is a graph of output efficiency versus current draw; FIG. 21 is graph of output horsepower versus current draw; FIG. 22 is a graph of output speed versus torque; and FIG. 23 is a graph of output torque versus current draw. Because of the higher efficiency of the preferred drive 50, a smaller motor may be used, and therefore a smaller controller and batteries may be used in some circumstances.

Pivot assembly 18 includes a front arm, such as caster arm 60, a swivel bearing 62, a caster support 64, and a caster wheel 66. Caster arm 60 is rigidly coupled to drive 50 via motor mounting plate 56. Preferably, a rearward end of caster arm 60 is affixed to an upper portion of mounting plate 56. Bearing 62 preferably has a barrel that is oriented vertically to enable caster wheel 66 to swivel or turn about a vertical axis to enhance the capability of wheelchair 10 to turn. Caster support 64 includes a fork on which an axle or bearing of caster wheel 66 is fixed.

Rear wheel assembly 20 includes an articulating beam 70 that is coupled to frame 24 at mounting plate 25*f*, a pair of swivel bearings 72, a pair of rear caster supports 74, and a pair of rear casters 76. Beam 70 is coupled to mounting plate 25*f* by any means that enables beam 70 to articulate to adapt to changes in the ground, such as a pivot having a horizontal pivot axis. Preferably, this pivot is located rearward of the battery compartment 26. Bearings 72 are disposed on distal ends of beam 70, and each preferably includes a barrel that is vertically oriented to enable the corresponding caster 76 to swivel or turn to enhance the capability of wheelchair 10 to turn. Caster support 74 includes a fork on which an axle or bearing of caster wheel 76 is fixed.

Transverse mounting of drives 50 enhances the ability to accomplish and configure the combination of generally rearward battery location and an articulating, transverse beam 70. For example, for conventional configurations having a motor that is perpendicular to the drive wheel axis (and requiring a right angle gearbox, which is not shown in the figures), the motor swings about the gearbox output shaft to impart motion to the front caster arm. Providing clearance for the swinging motion for such longitudinally mounted motors sacrifices space that may be used for locating the batteries. And because the articulating transverse beam also requires space for swinging (when, for example, only one rear caster is on a curb), configuring the combination of rear battery location and rear articulating, transverse beam would be difficult if conventional, longitudinally mounted motors with right angle gearboxes would be employed.

Support post 27, and preferably the connection between support post 27 and frame 24, is disposed rearward of drive motors 52, preferably generally rearward of drive assembly 16, and preferably rearward of the drive wheel axis of rotation C-DW. The connection between support post 27 and frame 24 may be the location at which the load from chair assembly 14 and the passenger is transmitted to frame 24. Battery housing 26, and thus batteries 82 or other power source, preferably is disposed substantially, and preferably entirely, rearward of drive wheel axis C-DW, and preferably substantially, and more preferably entirely, rearward of the support post 27 connection to frame 24. Also, the invention encompasses the center of gravity of batteries 82 or other power source being located rearward of the support 27 connection and/or rearward of drive wheel axis C-DW.

The generally rearward position of battery housing 26 and/or the capability of seat 30 to move forward (by the mechanisms 32 or 32' or any other mechanism) enables access to the batteries without fully removing seat 30. In this regard, the wheelchair cover, which typically covers the batteries and mechanical components, may be removable or configured with a hatch (not shown in the figures) to enable direct access to the batteries. Whether the seat is moveable or is fixed, the configuration of wheelchair 10 enables batteries to be accessed from behind the drive wheels, and preferably from the rear center (that is, the 6 o'clock position when viewed from above). When the seat is slideable forward or fixed (the latter configuration is not shown in the Figures), a technician may access the batteries while the wheelchair driver remains in the seat. This function enables only one technician to make a sales call to a wheelchair owners home, rather than requiring additional people to help the driver from the seat. As the present invention generally encompasses structures in which the batteries are not accessible from behind the drive wheels, no aspect of the present invention is limited to enabling access to batteries 82 as described herein, unless such limitation is expressly recited in the claim.

The loads borne by frame 24 are transmitted to the ground via drive wheels 58, front casters 66, and rear casters 76. As will be clear to people familiar with wheelchair design, the location of pivot 29 will affect the weight distribution of wheelchair 10. In this regard, the position of pivot 29 forward of drive wheel axis C-DW causes front casters 66 to bear a vertical load while wheelchair 10 is at rest, as mounting plate 56 is supported by drive wheel 58 via its axle. Configuring the wheelchair such that front casters 66 bears a vertical load during steady-speed operation on level ground and/or while at rest on level ground may, in some circumstances, enhance the stability and stable feel of a wheelchair, although load-bearing casters are not required.

In the preferred embodiment illustrated in the figures, the position of pivot 29 may be chosen to achieve the desired weight distribution and the desired downward load borne by front casters 66. The weight distribution and magnitude of load borne by the casters may be chosen according to such parameters as desired stability of the particular wheelchair during operation on level ground and while ascending and descending a step, motor torque and horsepower, other wheelchair dimensions (such as the horizontal distance from drive wheel axis C-DW to the rear casters), overall wheelchair weight, and like parameters.

For the wheelchair 10 shown in FIGS. 1-4, pivot axis 29 preferably is spaced apart from the front wheel axis by a horizontal dimension that is between 40% and 65%, more preferably between 45% and 60%, and even more preferably about 54% of the horizontal dimension between drive wheel axis C-DW and the front caster axis. Pivot axis 29 may be spaced apart from front wheel axis C-RC by less than or about 30% of the distance between the drive wheel axis and the front caster axis. Front casters 66 bear approximately 30% of the wheelchair load. A "horizontal" dimension or distance, when referring to pivot position, is measured parallel to a level ground plane in a direction of straight-ahead travel of the wheelchair (that is, perpendicular to the drive wheel axis) while the wheelchair is at rest. A "vertical" distance or dimension, or height, when referring to pivot position, is perpendicular to a level ground plane while the wheelchair is at rest.

Conventional wheelchairs having front casters often employ springs to bias the casters. The configuration of pivot assembly 18 enables the front suspension of wheelchair 10 to function without a spring bias on caster 66 because of the downward force applied to casters 66 described above. Forgoing biasing springs in the anti-tip wheels eliminates the step of adjusting spring bias for the weight of the wheelchair occupant. The present invention, however, is not limited to wheelchairs lacking springs, regardless of the type of front wheels employed.

Referring to FIG. 6A to illustrate a preferred horizontal relationship of some components, drive wheel axis C-DW has a height Hi, a centerline of pivot 29 defines a pivot axis C-P that has a height H2, and a centerline of front caster 66 defines a front caster axis C-FC that has a height H3. Preferably, front caster axis height H3 is approximately the same as or more than pivot axis height H2. The inventors believe that it is advantageous for pivot axis height H2 to be approximately below a line drawn between the drive wheel axis and axis of rotation of front caster 66.

Referring again to FIG. 6A to illustrate operation of wheelchair 10 while ascending from a level ground surface 200 up a curb, such as a step 201 having a face 202, a corner 203, and an upper surface 204. Wheelchair 10 may be driven forward until front caster 66 contacts face 202 or, as shown in FIG. 6A, corner 203. Applying torque to drive wheels 58 urges front caster 66 against corner 203. For a step height H4 that is less than front caster axis height H3, front caster 66 overcomes step 201 because of a force couple created by horizontal components of the driving force of wheelchair 10 and a reaction force from step 201. Also, in embodiments in which the front caster height H3 is greater than pivot height H2, a vertical, upward component of the reaction force or impulse applied at the wall tends to raise caster 66 (even if the height of curb face 202 is greater than the caster radius). This upward force also enables or enhances wheelchair 10 to overcome a step having a height that is approximately the same as caster axis height H3.

Figure 6B:
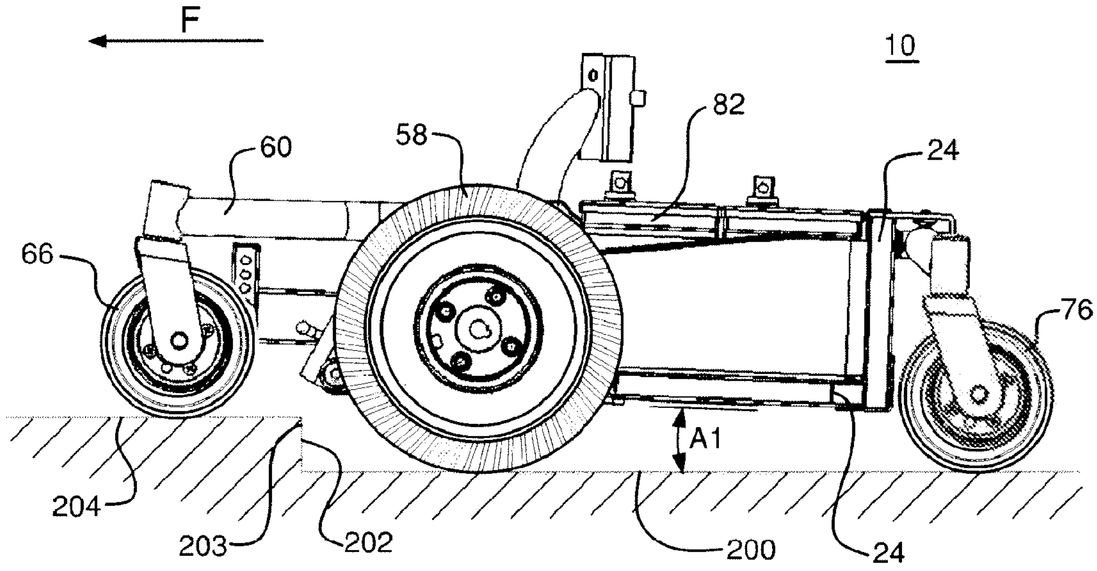
FIG. 6B is a side view of the wheelchair shown in FIG. 6A illustrating the wheelchair ascending a curb.

FIG. 6B illustrates the partially ascended position in which front caster 66 is disposed on step upper surface 204 while drive wheel 58 and rear caster 76 are disposed on ground surface 200. Front arm 60 and mounting plate 56 have been pivoted clockwise (as oriented in FIG. 6B) from the at-rest position in which all six wheels are in contact with ground surface 200. In the position shown in FIG. 6B, frame 24 of wheelchair 10 tips slightly upward from its at rest position, as mounting plate 56 pivots—clockwise as oriented in FIG. 6B—about drive wheel axis C-DW. In this regard, front arm 60 pivots as caster 66 moves from ground surface 200 to step upper surface 202, and the corresponding pivoting of mounting plate 56 about drive wheel axis C-DW results in a corresponding pivoting of pivot 29 about drive wheel axis C-DW. Upward movement of pivot 29 results in a upward movement of the forward portion of frame 24. For the embodiment shown in FIG. 6B, frame 24 tips by an angle A1 of approximately 2.5 degrees upon front caster 66 initially touching lower surface 212.

Figure 6C:
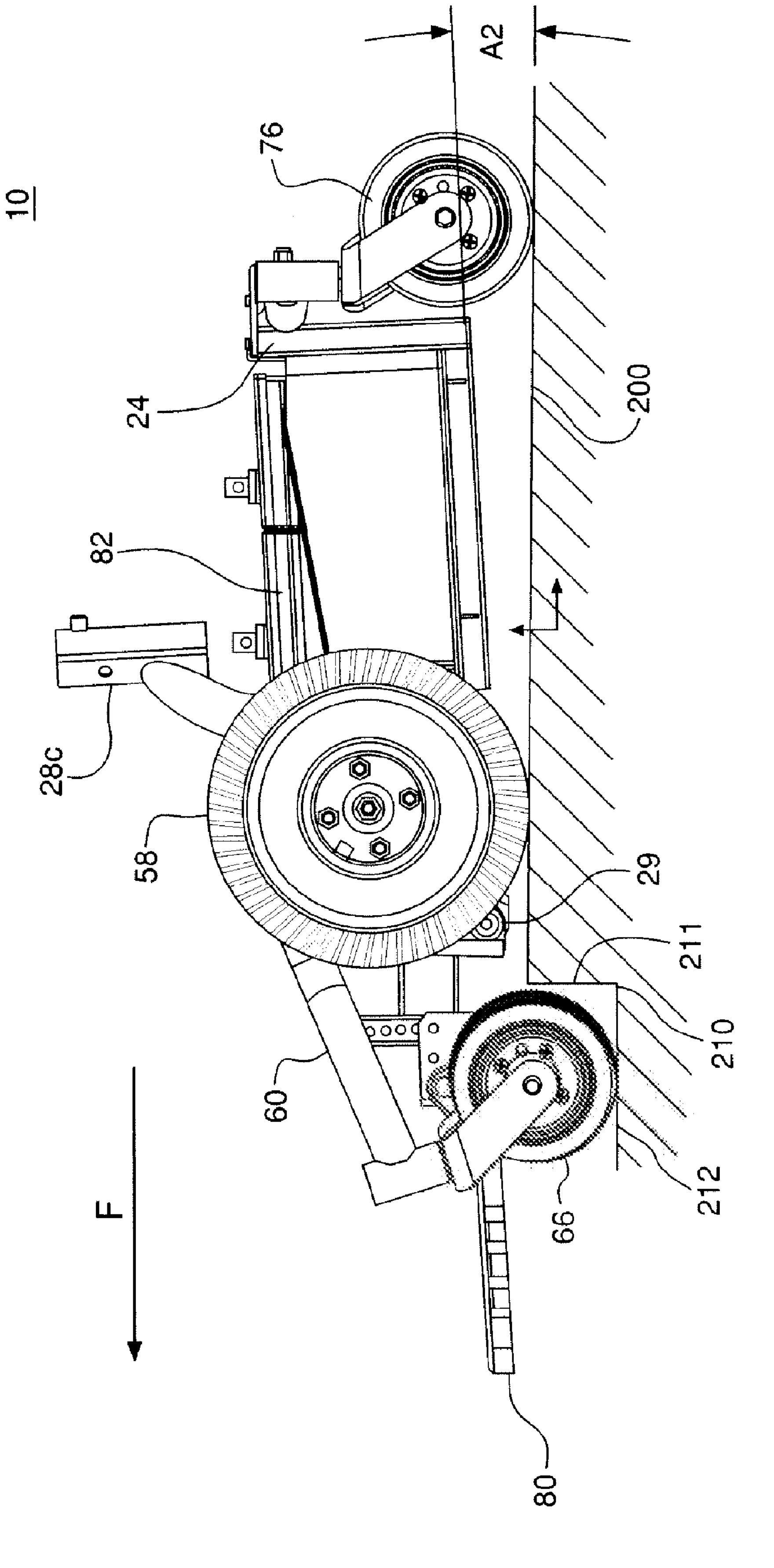
FIG. 6C is a side view of the wheelchair shown in FIG. 6A illustrating the wheelchair descending a curb.

FIG. 6C illustrates wheelchair 10 in the process of descending a step 210, which includes a face 211 and a lower surface 212. Front caster 66 is shown on the lower surface 212 of the step and drive wheels 58 and rear wheels 76 are on the ground surface 200. As caster 66 is driven over the lip of step 210, front caster 66 is urged from the upper surface 100 to the lower surface 212 by the downward force from frame 24 transmitted to plate 56 via pivot 29.

In the position shown in FIG. 6C, frame 24 of wheelchair 10 tips slightly forward from its at rest position, as mounting plate 56 pivots—counterclockwise as oriented in FIG. 6C—about drive wheel axis C-DW. In this regard, front arm 60 pivots as caster 66 moves from step upper surface 200 to step lower surface 212, and the corresponding pivoting of mounting plate 56 about drive wheel axis C-DW results in a corresponding pivoting of pivot 29 about drive wheel axis C-DW. Downward movement of pivot 29 results in a downward movement of the forward portion of frame 24. For the embodiment shown in FIG. 6C, frame 24 tips by an angle A2 of approximately 3 degrees upon front caster 66 initially touching lower surface 212.

The present invention encompasses a wheelchair having one or both of the vertical and horizontal pivot locations described herein, which will be referred in this and the following two paragraphs as a low pivot and a forward pivot, respectively. In general, low pivots may have been disfavored because of the need for clearance over the ground, even when the ground is uneven. Further, the pivot must clear an obstacle, such as a curb, during climbing, which may require lifting the frame at the pivot by a change in height that is greater than if the pivot was at a higher location. Further, considering lifting of the front pivot, forward pivot locations may have been disfavored because of diminished mechanical advantage of forward pivot positions.

For configurations in which the pivot axis C-P is below the caster axis C-FC, a force applied through the wheelchair via front caster 66 onto vertical obstacle face 22 creates an upward component of the force vector by the nature of the orientation of the pivots C-P and C-FC. This upward component of force may be helpful for ascending especially high obstacles, as explained above. The low pivot also aids even in circumstances in which the pivot axis C-P is at the same height or slightly higher than caster axis C-FC by keeping the downward component of the force near zero or small, such that motor torque may be used to climb the obstacle.

The configuration described herein, with any combination of low pivot, forward pivot, rigid coupling together of the drive assembly and front arm, transverse drives, and rear battery location provides a combination of beneficial wheelchair stability and curb climbing capabilities. The configuration shown naturally has good forward stability (that is, wheelchair 10 does not easily tip forward), and the rear articulating transverse beam enhances rearward stability (especially backwards tipping) compared with separately sprung rear arms.

Some aspects of the present invention depend on neither the low pivot nor the forward pivot, and the present invention should not be construed to require either or both of a low pivot or forward pivot unless the structure is explicitly stated in the claim. Nor should the present invention be construed to require any other feature disclosed herein, even if the specification emphasizes its advantages, unless the structure is explicitly stated in the claim.

FIGS. 7A, 7B, 8A, 8B, and 9 illustrate another embodiment, in which a wheelchair 10' includes a frame assembly 12', a chair assembly 14', a drive assembly 16', a front pivot assembly 19, and a rear wheel assembly 20'. Structure of wheelchair 10' that corresponds to structure of the first embodiment wheelchair 10 is designated with a prime (') symbol after the reference numeral. Chair assembly 14' is essentially the same as the chair assembly 14 shown in FIGS. 1-5 and 11-13, and rear wheel assembly 20' is essentially the same as rear wheel assembly 20 shown in FIGS. 1-5. Accordingly, descriptions of chair assembly 14' and rear wheel assembly 20' are omitted from the description of second wheelchair embodiment 10'.

Figure 7A:
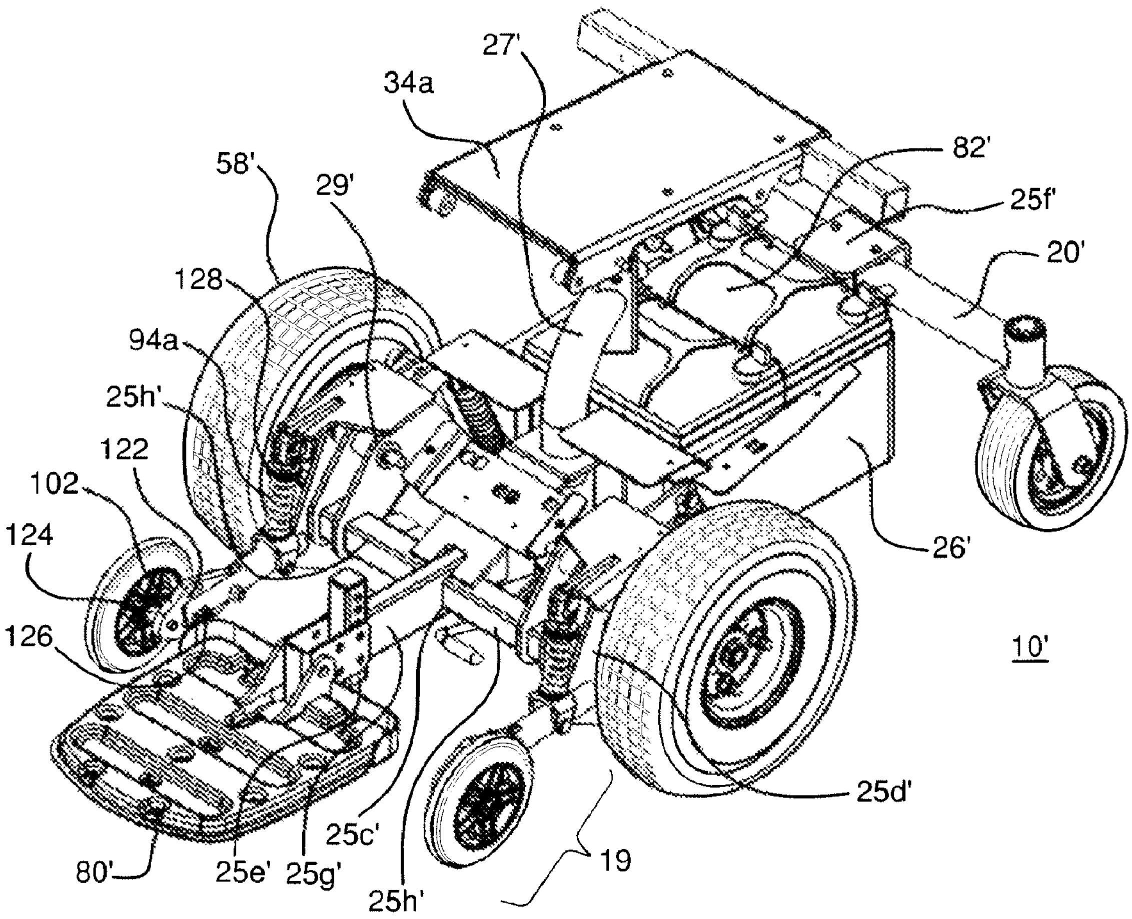
FIG. 7A is a perspective view of another embodiment of a wheelchair with a portion of the chair assembly and cover removed.
Figure 7B:
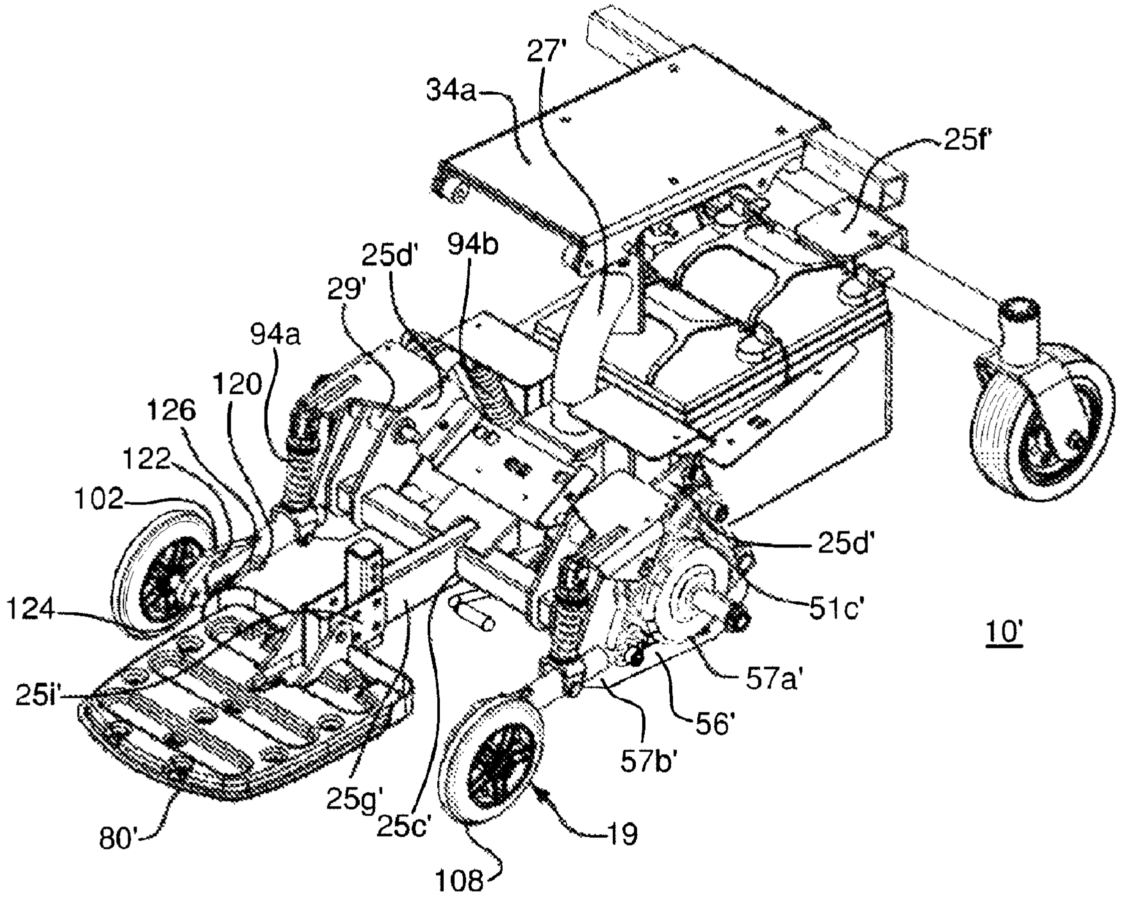
FIG. 7B is a perspective view of the wheelchair of FIG. 7A with the drive wheels and a portion of the mounting plate removed.

Frame assembly 12' in the embodiment shown in FIGS. 7A and 7B is a rigid, box-like structure that is formed of welded and/or bolted square and round tubing and formed plates. The frame structure, which is generally referred to herein by reference numeral 24', includes a central support **25*a*', a rear support 25*b*', a T-shaped support 25*c*', a pair of pivot supports 25*d*', and a footrest support 25*e*'**.

Figure 8A:
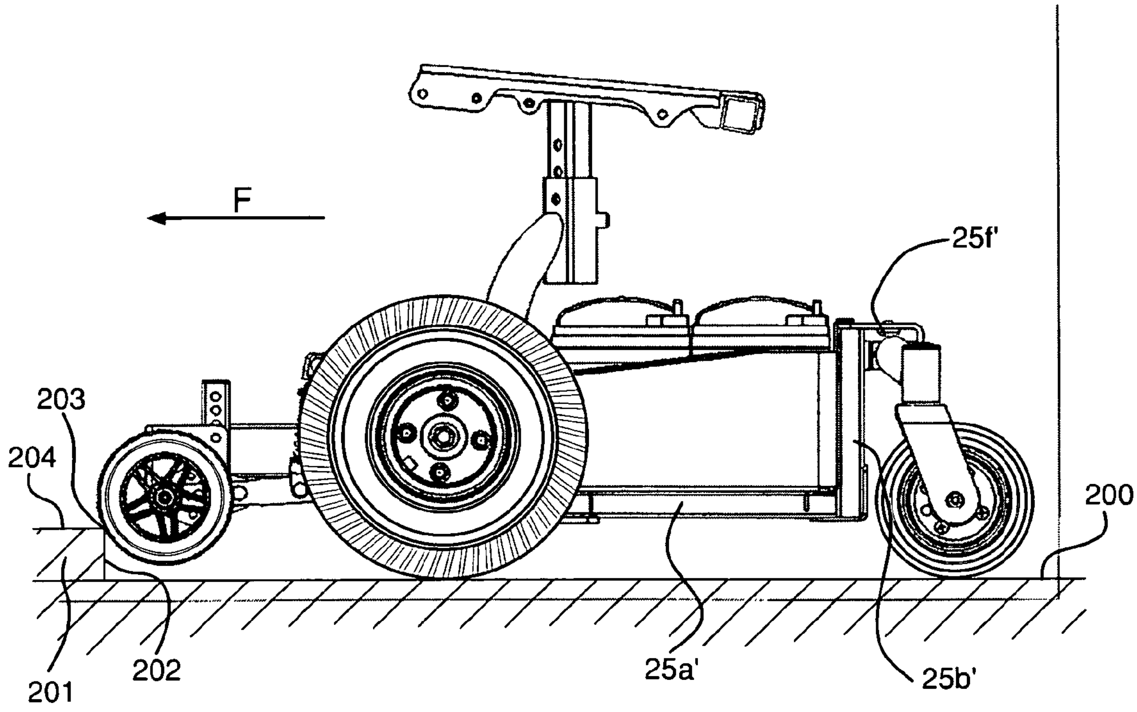
FIG. 8A is a side view of the wheelchair shown in FIG. 7A.
Figure 8B:
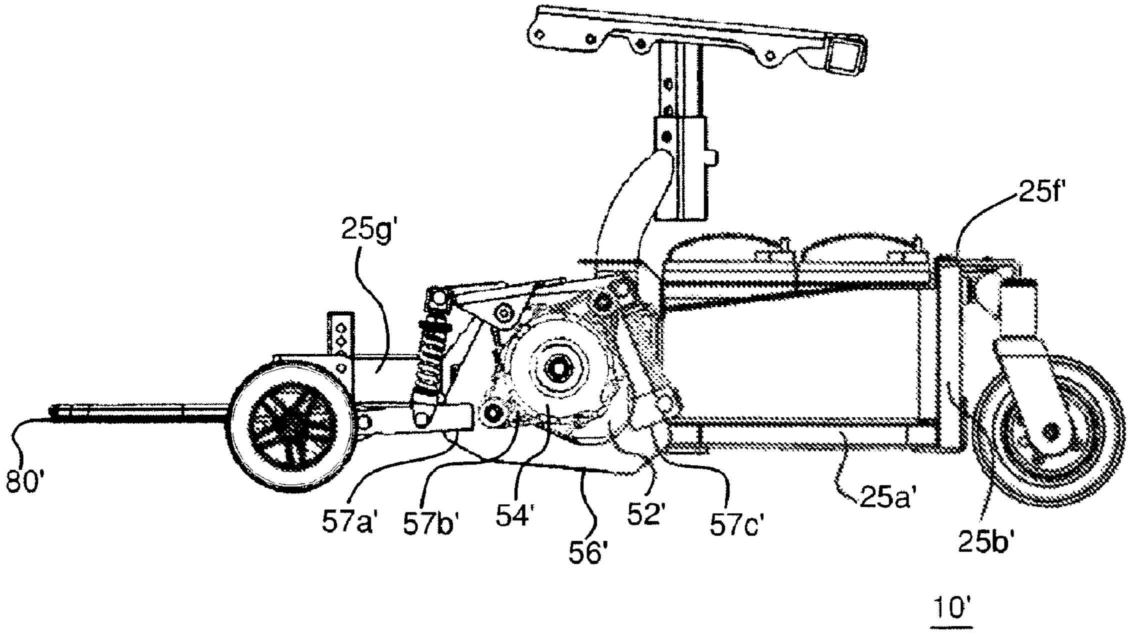
FIG. 8B is a side view of the wheelchair shown in FIG. 7A with the drive wheel and a portion of the mounting plate removed.
Figure 9:
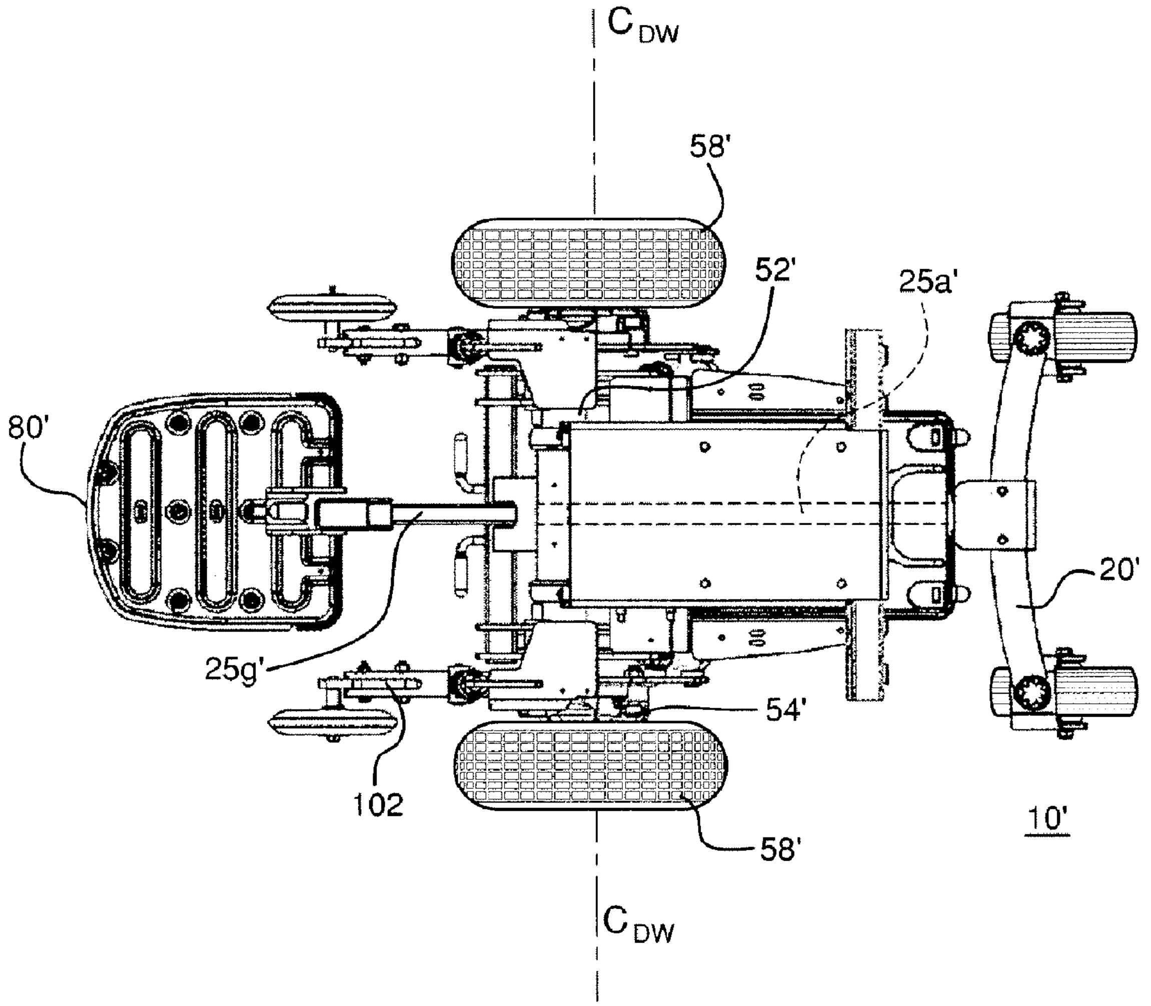
FIG. 9 is a top view of the wheelchair shown in FIG. 7A.

Central support **25*a*', which is best shown in FIGS. 8A, 8B, and (schematically in dashed lines) FIG. 9, is disposed along a horizontal centerline of the wheelchair 10'. Rear support 25*b*', which is shown in FIG. 9, extends upwardly from a rear portion of central support 25*a*' and includes a mounting plate 25*f*. T-shaped support 25*c*' is disposed above and forward of central support 25*a*' and includes a longitudinal portion 25*g*' and a pair of transverse supports 25*h*'. Pivot supports 25*d*' preferably are substantially vertical plates that extend generally upwardly from transverse supports 25*h*'. Footrest support 25*e*' is disposed at a forward end of longitudinal portion 25*b* of T-shaped support 25*c*. A footrest 80' is coupled to footrest support 25*e*'. A housing 26' for holding batteries 82' and a support post 27' are generally the same as described above with respect to first embodiment wheelchair 10**.

Drive assembly 16' of second embodiment wheelchair 10' includes a pair of drives 50', each of which includes a motor 52' and a gearbox 54', a mounting plate 56', and a pair of drive wheels 58'. Motor 52' preferably is oriented with its centerline (that is, the central axis of its output shaft) parallel to the output shaft of gearbox 54', which is coupled to a drive wheel 58' as shown in the figures. A longitudinal centerline of the output shaft of gearbox 54' is collinear with the drive wheel rotational axis, which is designated C-DW. Motor 52' may be oriented such that its centerline is collinear with or—as shown in the figures—is parallel to, but offset from, drive wheel rotational axis C-DW and the output shaft of gearbox 54'. Accordingly, drives 50' preferably are mounted transverse to the direction of translation of the wheelchair. The forward direction of wheelchair translation is indicated in FIG. 8A by arrow F. Also, the present invention encompasses motors 52' having a centerline (that is, the central axis of its output shaft) that is not parallel to the drive wheel rotational axis C-DW unless such relationship is explicitly set forth in the claims.

Drive 50' is rigidly affixed to mounting plate 56'. Mounting plate 56' is pivotally connected to pivot support **25*d*' by pivot 29', as best shown in FIGS. 7A and 7B. Mounting plate 56' preferably is planar and oriented perpendicular to rotational axis C-DW of drive wheels 58'. Mounting plate 56' includes a motor-mounting portion 57*a*' to which drive 50' is bolted, a front projection 57*b*' that extends forward from mounting portion 57*a*', and a rear projection that extends rearward from mounting portion 57*a*'. As explained more fully below, front projection 57*b*' provides a surface for the attachment of the arm of pivot assembly 19; rear projection 57*c*'** provides a surface for attachment of a bracket to which a spring is mounted.

Pivot assembly 19 includes a forward-extending front arm, such as fixed wheel or anti-tip wheel arm 90, and a suspension assembly 91. Arm 90 includes a front end **92*a* to which an adjustment plate 102 is connected and a rear end 92*b* that is affixed to front projection 57*b*'**.

Adjustment plate 102 includes a pivotable connection 120, holes 122 formed through plate 102, and a bearing mounting 124 to which a front wheel 108 is attached. A bolt or pin 126 extends horizontally through arm front end **92*a* and through one of holes 122. The height of wheel 108 may be adjusted by removing pin 126, pivoting plate 102 up or down to a desired position, and replacing pin 126 into another one of holes 122. The height of wheel 108 may be adjusted to be closely spaced apart from ground plane surface 200 or adjusted such that the rotational axis of wheel 108 is higher than an expected curb height. In general, the purpose, procedure, and desired position for adjusting the height of anti-tip wheels 108 will be understood by persons familiar with wheelchair technology. Adjustment plate 102** is shown for illustration, and the present invention is not limited to wheelchairs having a front wheel height adjustment nor to a particular configuration of a height adjustment mechanism.

Suspension assembly 91 preferably includes a front spring **94*a* and a rear spring 94*b*. Front spring 94*a* has an upper end that is pivotally connected to a mounting bracket 96*a* that extends from an upper portion of pivot support 25*d*'. A lower end of spring 94*a* is pivotally connected to an intermediate portion of arm 90 between arm front end 92*a* and arm rear end 92*b*, and thus spring 94*a* acts on arm 90 forward of mounting plate 56' and rearward of adjustment plate 102. Rear spring 94*b* has an upper end that is pivotally connected to a mounting bracket 96*b* that extends rearward from pivot support 25*d*' and a lower end that is pivotally connected to a rearward portion 57*c*' of mounting plate 56'. Preferably, front spring 94*a* includes a threaded rod and adjustment nut 128 to adjust the spring force and height of spring 94*a***.

Figure 10:
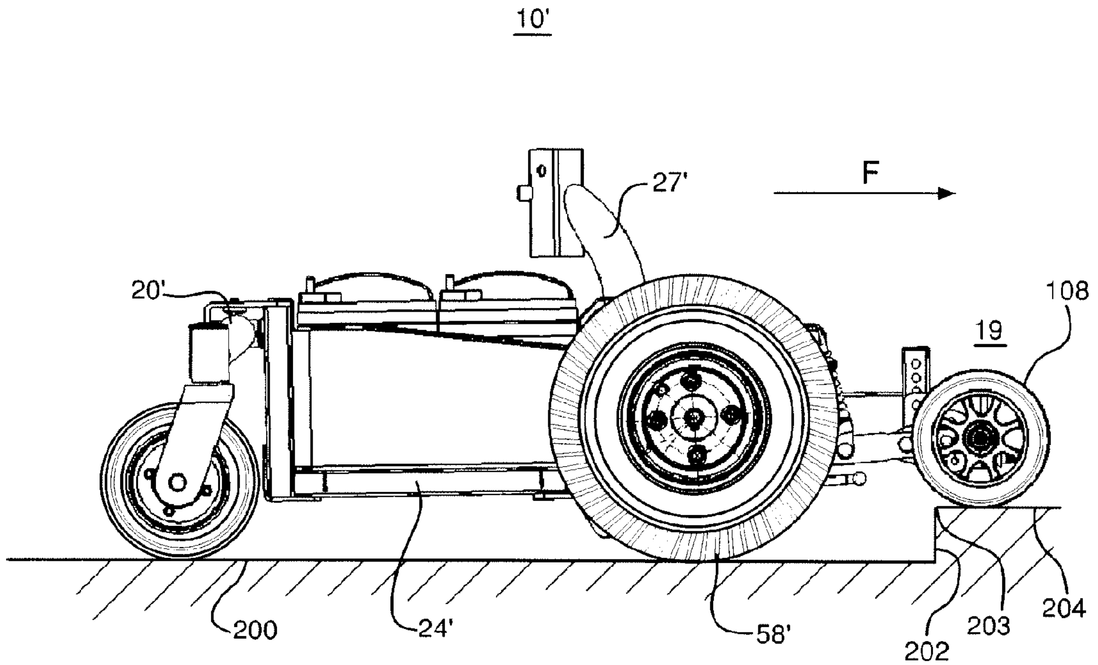
FIG. 10 is a side view of the wheelchair shown in FIG. 7A illustrating the wheelchair ascending a curb.

Springs **94*a* and 94*b* each resist pivoting of mounting plate 56' because of weight of frame 24' and thus position mounting plate 56' and position arm 90. Also, each spring 94*a* and 94*b* resists pivoting of mounting plate 56' in response to contact with an obstacle. In this regard, FIG. 10 illustrates the operation of wheelchair 10' as it encounters a corner 203 of curb 201. Because the height of the axis of fixed wheel 108 is greater than the height of curb 201, wheel 108 rides over curb 201 when urged forward by the wheelchair drive 50'. Arm 90 and mounting plate 56' rotate clockwise (as oriented in FIGS. 8A and 8B) until wheel 108 overcomes corner 203 to reach upper surface 204. Wheelchair 10' continues moving forward until drive wheels 58' contact and overcome curb 201**.

Upon initially mounting or ascending curb 201, frame 12' preferably tilts slightly upward. The position of the pivoting connection 29' may be chosen to cooperate with the operation of wheel 108 and drive wheels 58', as will be understood by persons familiar with wheelchair design and configuration in view of the present disclosure. Also, the position of pivot connection 29' enhances the capability of arm 90 of wheelchair 10' to rise relative to the ground in response to an increase in motor torque and/or to wheelchair acceleration. Front casters 66 of first embodiment wheelchair 10 generally remain in contact with the ground surface in response to most applications of motor torque and/or acceleration. The present invention, however, is not limited by the capability or lack of capability of the arms, such as arms 60 or 90, raising in response to application of motor torque, acceleration, or like operations.

The spatial relationship between support post 27', drive motors 52', and batteries 82' is the same as described above with respect to first embodiment wheelchair 10. Accordingly, the capability of chair 30' to move forward enables or enhances access to batteries 82' without fully removing chair 30' from frame 24', as explained more fully above.

FIGS. 24, 25, 26A, 26B, 27A, 27B, 28A, and 28B illustrate yet another embodiment, in which a wheelchair 310 includes a frame assembly 312, a seat 314, a drive assembly 316, a front pivot assembly 319, and an articulating beam assembly 320. The operation of wheelchair 310 is conceptually similar to the operation of wheelchair 10 shown in FIGS. 6A-6C. Accordingly, an illustration of the operation of wheelchair 310 is omitted from the description of third wheelchair embodiment 310.

Frame assembly 312 in the embodiment shown in FIGS. 26A, 26B, 29 and 30 is a rigid structure preferably formed of welded and/or bolted square and round tubing and formed plates. The frame structure, which is generally referred to herein by reference numeral 324, includes a central support 325*a*, pivot supports 325*d*, a footrest support 325*e*, a longitudinal support 325*g*, a transverse support 325*h*, and a support post 327.

Figure 29:
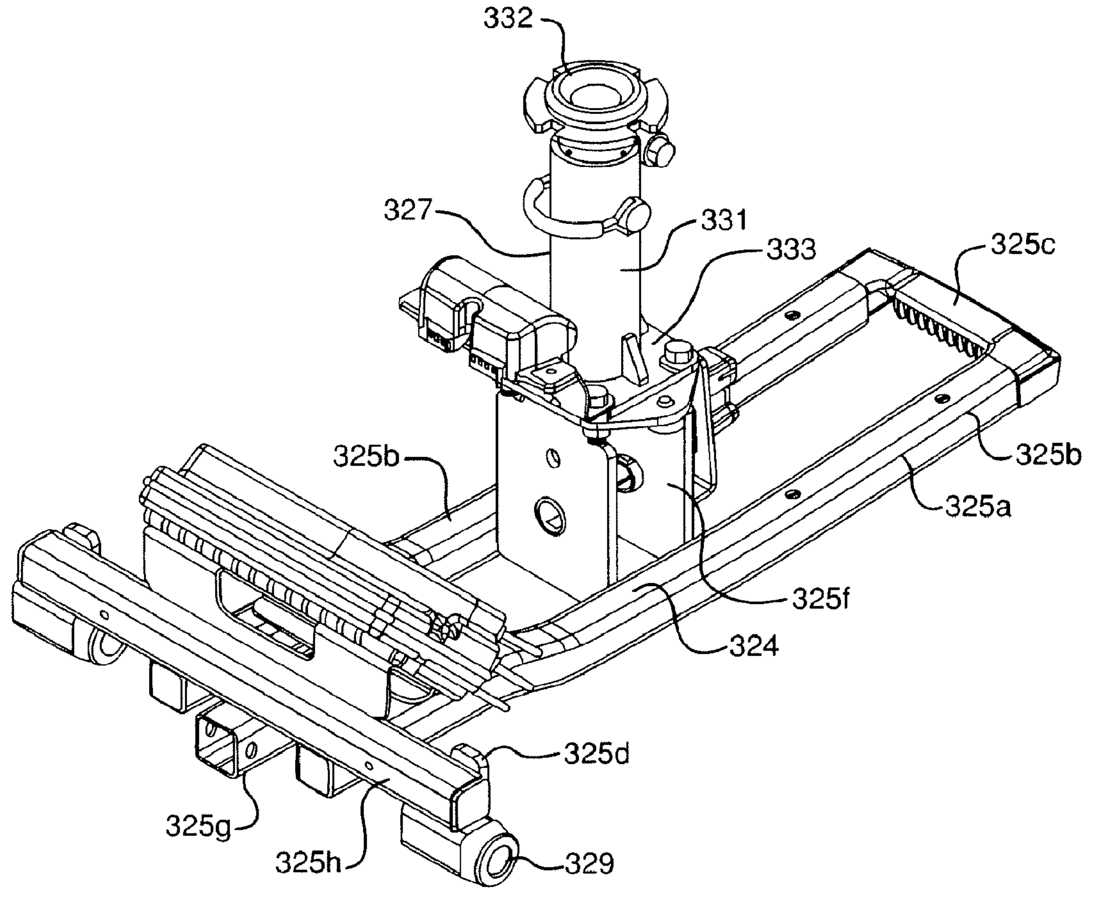
FIG. 29 is a perspective view of the frame of the wheelchair shown in FIG. 24.

Central support 325*a*, which is best shown in FIG. 29, is disposed along a horizontal centerline of wheelchair 310 and consists of two generally parallel supports 325*b* coupled together by a rear support 325*c* at a rear portion of central support 325*a*. Longitudinal support 325*g* is generally disposed between parallel supports 325*b* and generally below transverse support 325*h*. Transverse support 325*h* is generally coupled to the front portion of central support 325*a*. Pivot supports 325*d* preferably are substantially vertical plates that extend generally upwardly from transverse support 325*h*. A footrest support 325*e* is disposed at a forward end of longitudinal support 325*g*. A footrest 380 is coupled to footrest support 325*e*.

A battery compartment 326 for holding batteries or other power source is preferably bolted or welded to frame 324. Battery compartment 326 can be a housing or area designated for the batteries or power source.

A chair support, such as support post 327, extends upwardly from frame 324, as best shown in FIG. 29. Support Post 327 includes two substantially vertical and parallel mounting plates 325*f* generally disposed between central support 325*a*, and a seat post 331 coupled together by a support plate 333. Mounting plates 325*f* are substantially perpendicular to parallel supports 325*b*. Seat post 331 includes a cloverleaf coupling mechanism 332 disposed at an upward position of seat post 331. Coupling mechanism 332 couples seat 314 to seat post 331. Preferably, coupling mechanism 332 locks seat 314 into position. Seat 314 can be any seat suitable for holding a passenger.

Figure 30:
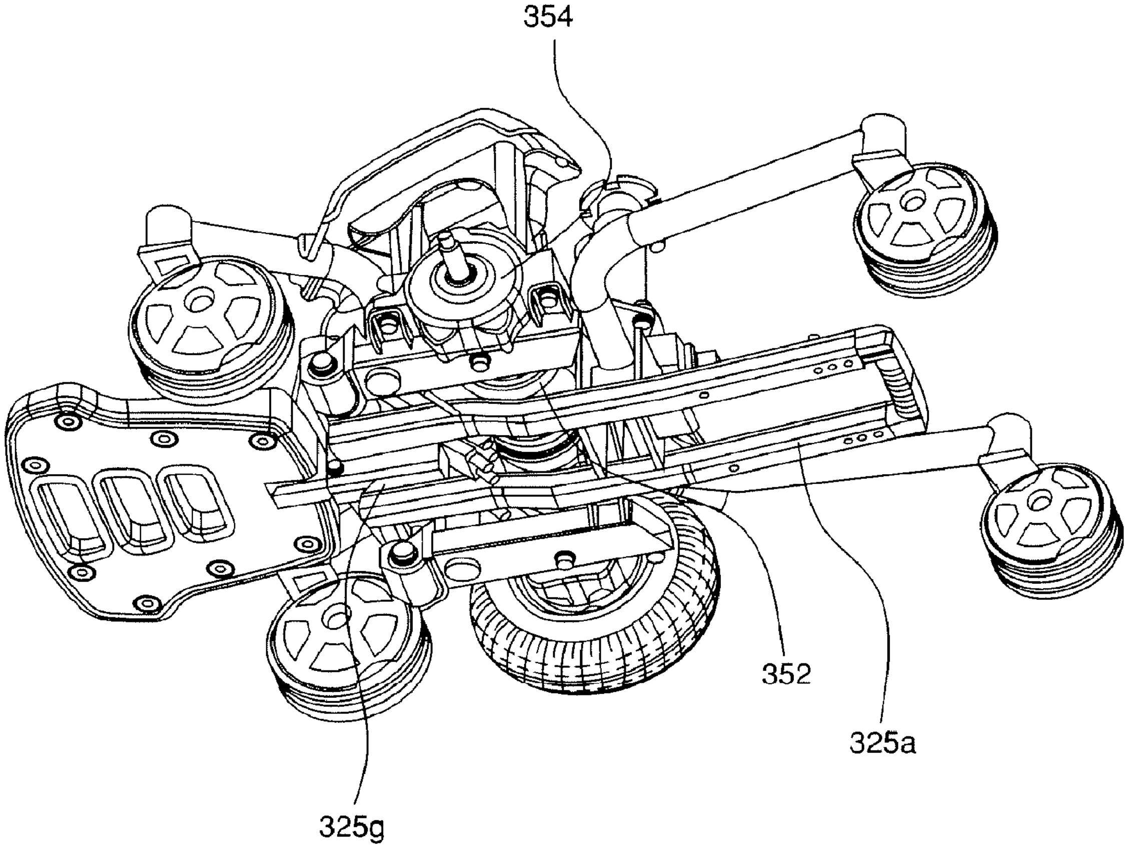
FIG. 30 is a perspective view of the bottom of the wheelchair shown in FIG. 24 with the seat removed.

Wheelchair 310 includes a pair of drive assemblies 316 and pivot assemblies 318 as shown in FIG. 30 et al. Preferably, the left combination of drive assembly 316 and pivot assembly 318 is the mirror image of the right combination of drive assembly 316 and pivot assembly 318. For convenience, only one of each assembly drive 316 and pivot assembly 318 is described in detail herein, as it is clear that the description applies equally to each one of the left and right assemblies 316 and 318.

Figure 26A:
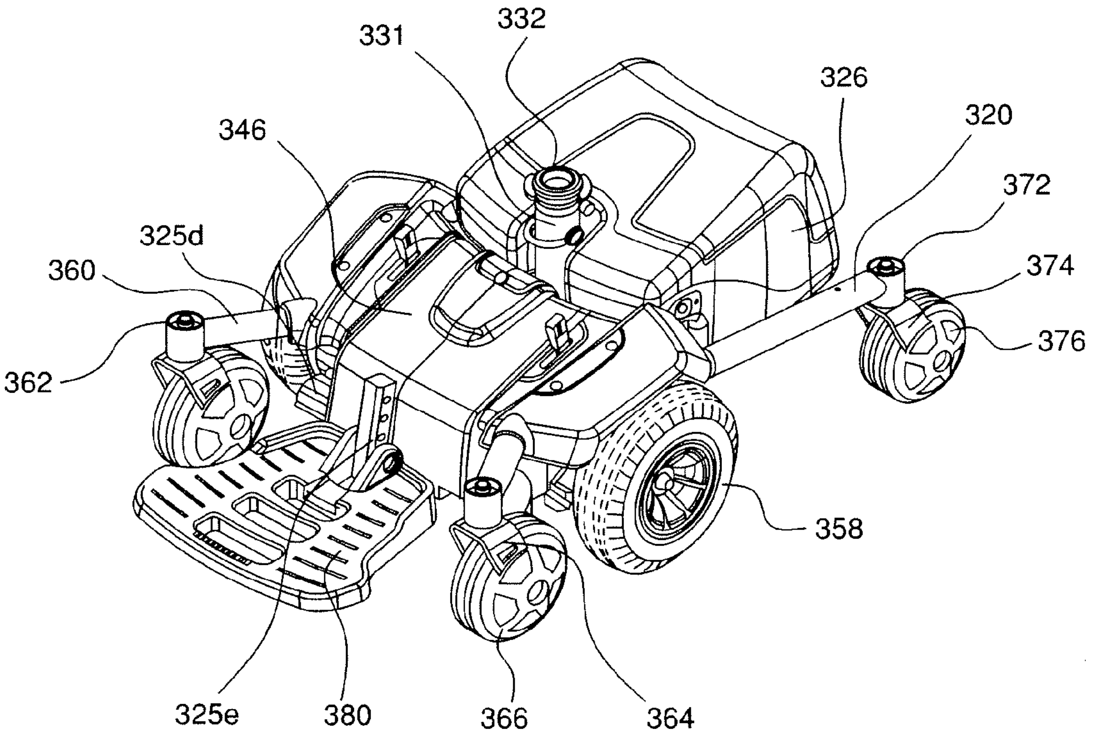
FIG. 26A is a perspective view of the wheelchair shown in FIG. 24 with the seat removed.
Figure 26B:
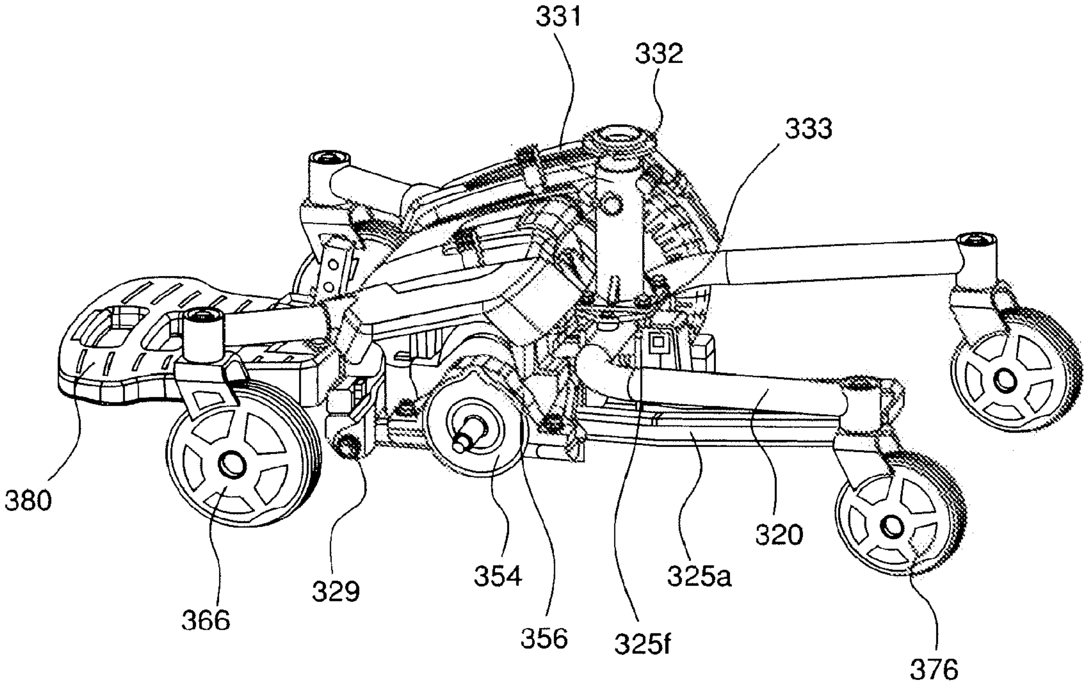
FIG. 26B is a perspective view of the wheelchair shown in FIG. 26A with the drive wheel and battery compartment removed.
Figure 27A:
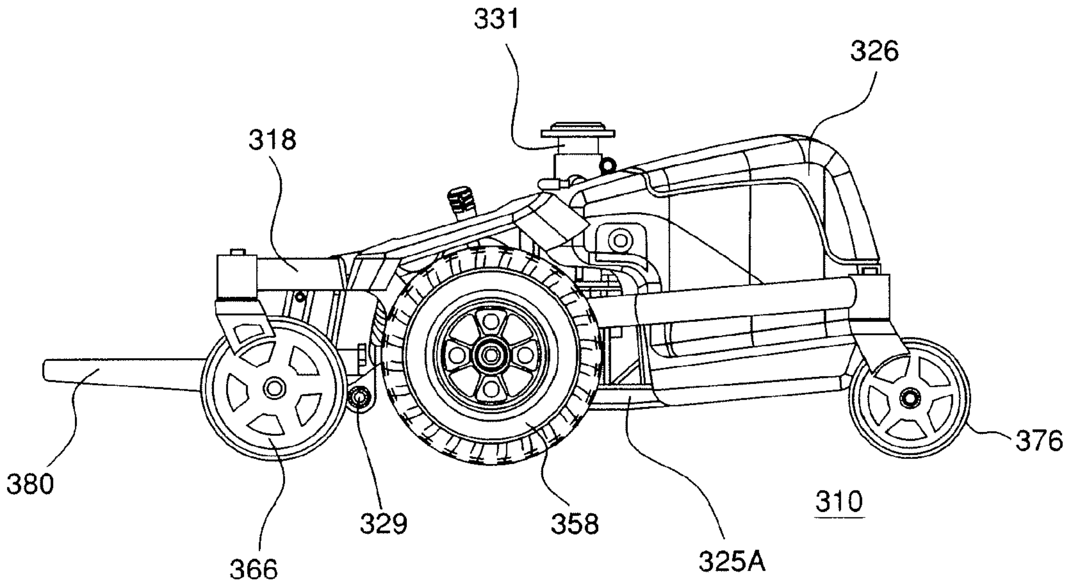
FIG. 27A is a side view of the wheelchair shown in FIG. 24 with the seat removed.
Figure 27B:
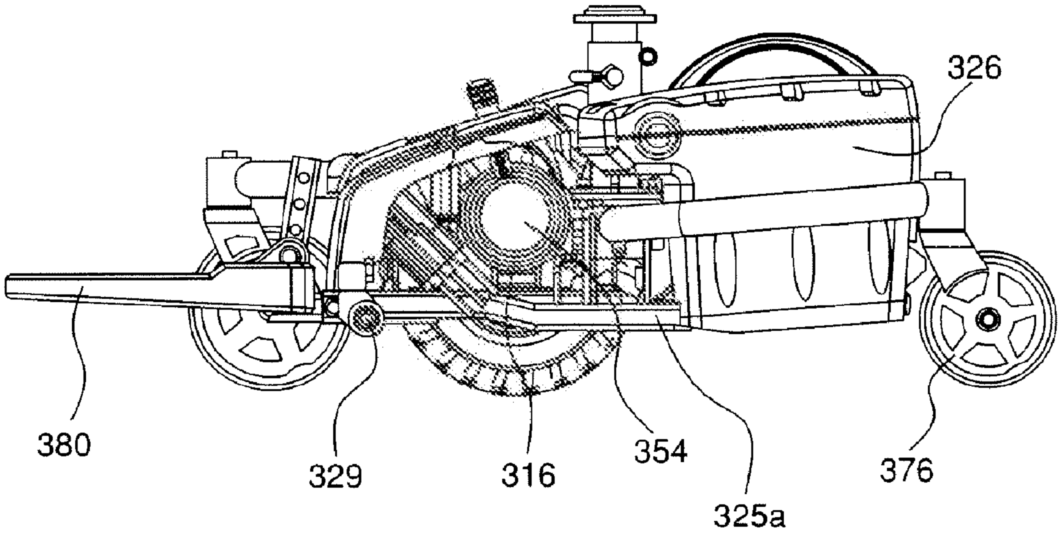
FIG. 27B is a side view of the wheelchair as shown in FIG. 27A with the drive wheel and portions of the front pivot assembly removed.
Figure 28A:
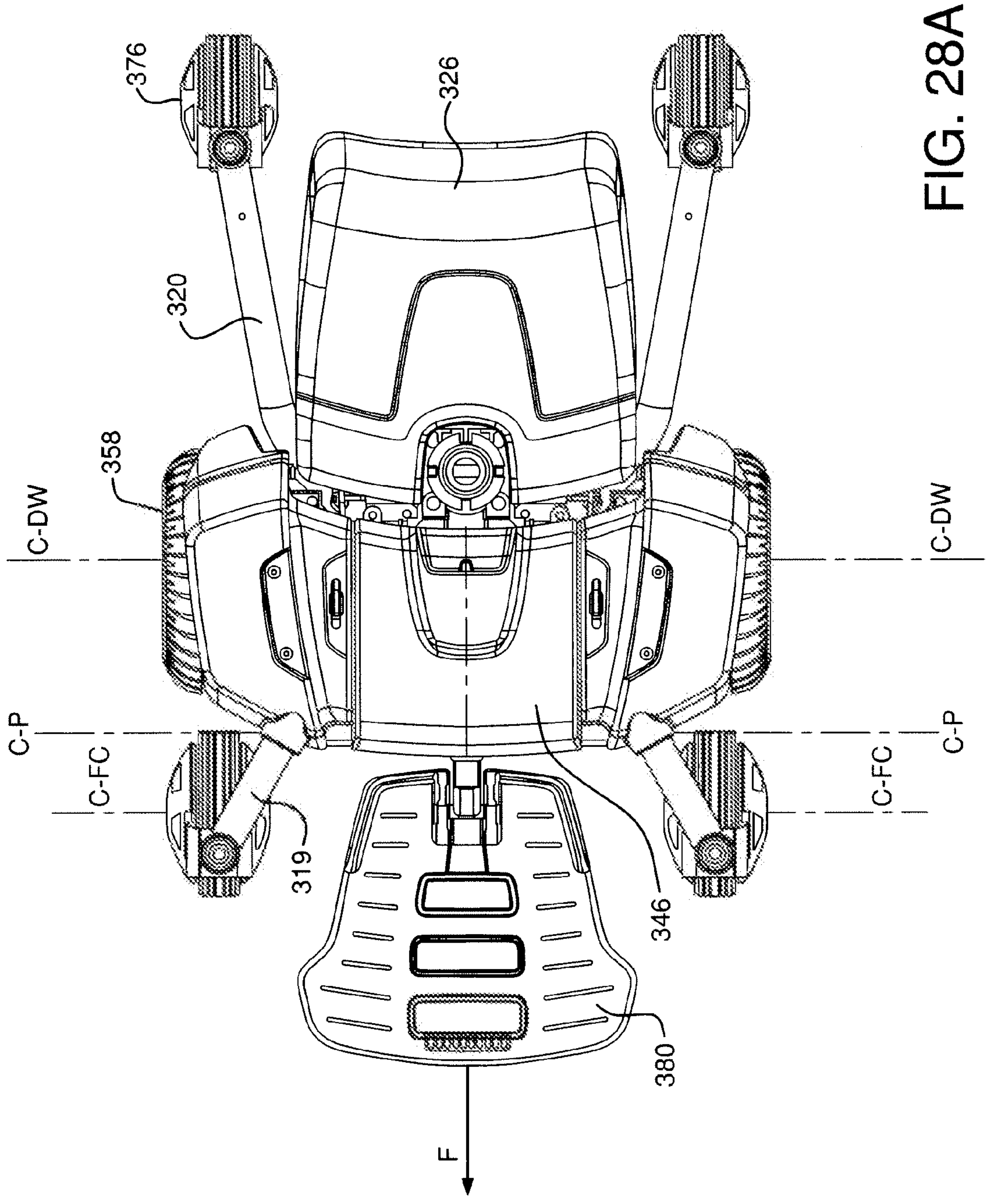
FIG. 28A is a top view of the wheelchair shown in FIG. 24 with the seat removed.
Figure 28B:
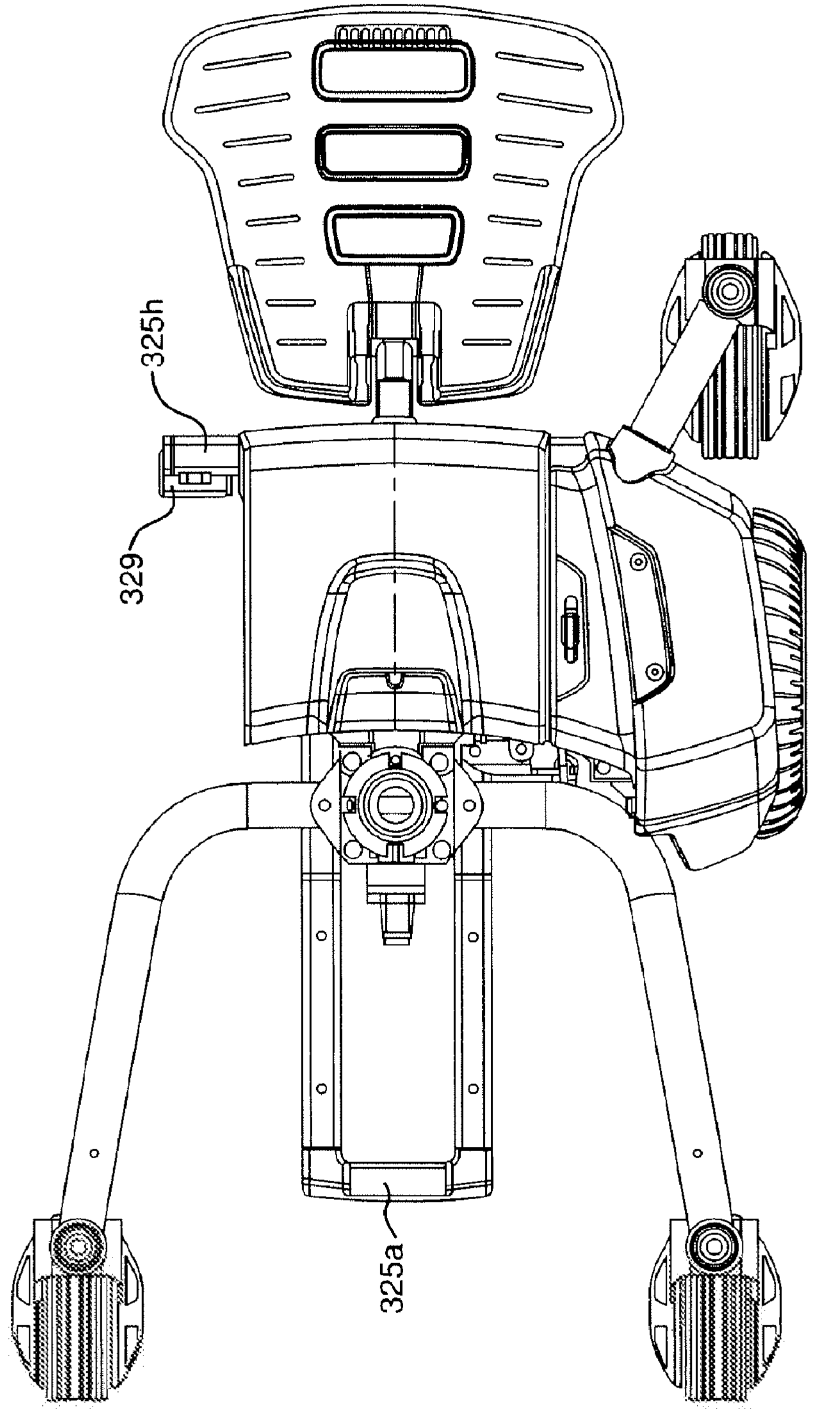
FIG. 28B is a top view of the wheelchair as shown in FIG. 28A with the drive wheel and portions of the front pivot assembly removed.
Figure 32:
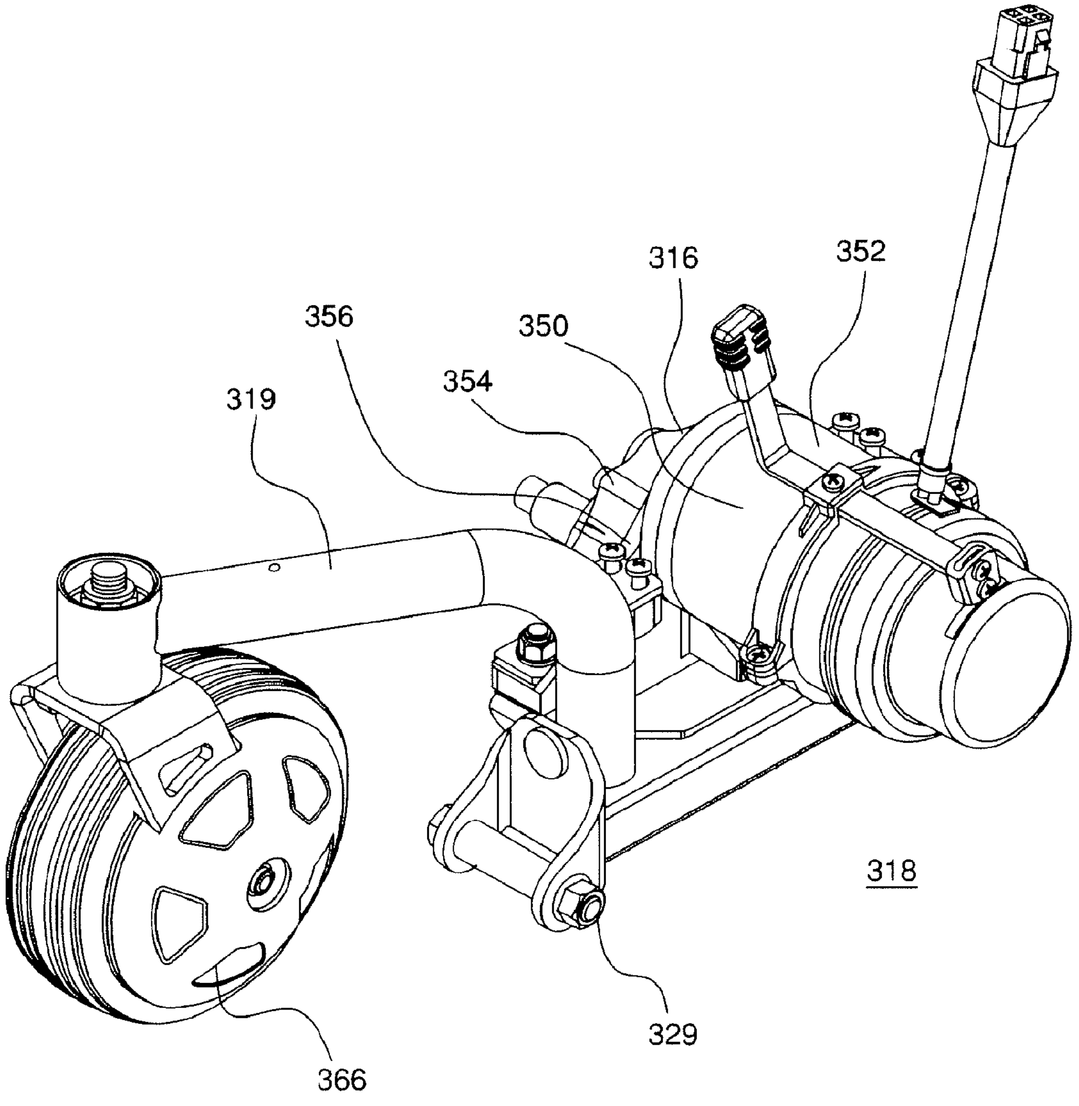
FIG. 32 is a perspective view of the pivot assembly shown in FIG. 31.

Drive assembly 316 includes a pair of drives 350, each of which includes a motor 352, a gearbox 354, and a mounting plate 356 as illustrated in FIGS. 26A, 26B, and 32. Each one of the drive assemblies is connected to one of a pair of drive wheels 358. Drive assembly 316 is pivotally coupled to frame assembly 312 by a pivot 329 between frame structure 324 and mounting plate 356. Motor 352 preferably is oriented with its centerline (that is, the central axis of its output shaft) parallel to the output shaft of gearbox 354, which is coupled to a drive wheel 358 as shown in the figures. A longitudinal centerline of the output shaft of gearbox 354, which preferably is a single reduction gearbox, is collinear with the drive wheel rotational axis, which is designated C-DW. Motor 352 may be oriented such that its centerline is collinear with or—as shown in the figures—is parallel to, but offset from, drive wheel rotational axis C-DW and the output shaft of gearbox 354.

Drives 350 preferably are mounted transverse too the direction of translation of the wheelchair. As illustrated by arrow F shown for example in FIGS. 28A, and 31 the direction of translation is parallel to a ground plane surface 200 on which the wheelchair moves forward and perpendicular to the rotational axis C-DW of the drive wheels 358. The transverse axis is parallel to the axis of rotation of the drive wheels 358 and parallel to the level ground. As used herein, the orientation of rotational or pivotal axes are based on the wheelchair at rest on level ground surface 200 with all wheels oriented to roll straight forward (direction F). Also, the present invention encompasses motors 352 having a centerline (that is, the central axis of its output shaft) that is not parallel to the drive wheel rotational axis C-DW. The present invention (that is, as recited in a claim) is not limited to any relationship or orientation of any part of the drive relative to the frame unless such relationship or orientation is explicitly stated in the claim.

Drive 350 is rigidly affixed to mounting plate 356. Mounting plate 356 preferably is oriented perpendicular to rotational axis D-DW of drive wheels 358. Preferably, gearbox 354 is bolted onto mounting plate 356. Mounting plate 356 houses a portion of pivot 329 for pivotally connecting mounting plate 356 to pivot support 325d of frame 324.

The configuration of drive 350 is substantially the same as the configuration of drive 50 of wheelchair 10. Preferably drive 350, which is shown in FIG. 32, includes a 24 volt DC motor rated for 3.0 amps and a single reduction gearbox having a reduction ratio of 17.75:1. The no-load speed rating is 166 mph. Because drive 350 is substantially the same as drive 50, the benefits and advantages drive 350 provides compared with a conventional worm-gear, right angle drive having a 4500 rpm motor rated for 2.1 amps (at no load) and a 32:1 gear ratio re substantially the same as those provided by the configuration of drive 50 of wheelchair 10 as described in FIGS. 20 through 23. FIG. 20 is a graph of output efficiency versus current draw; FIG. 21 is a graph of output horsepower versus current draw; FIG. 22 is a graph of output speed versus torque; and FIG. 23 is a graph of output torque versus current draw. Because of the higher efficiency of the preferred drive 350, a smaller motor may be used, and therefore a smaller controller and batteries may be used in some circumstances.

Pivot assembly 318 includes a front arm, such as caster arm 360, a swivel bearing 362, a caster support 364, and a caster wheel 366. Caster arm 360 is rigidly coupled to drive 350 via motor mounting plate 356. Preferably, a rearward end of caster arm 360 is affixed to an upper portion of mounting plate 356. Bearing 362 preferably has a barrel that is oriented vertically to enable caster wheel 366 to swivel or turn about a vertical axis to enhance the capability of wheelchair 310 to turn. Caster support 364 includes a fork on which an axle or bearing of caster wheel 366 is fixed.

Figure 33:
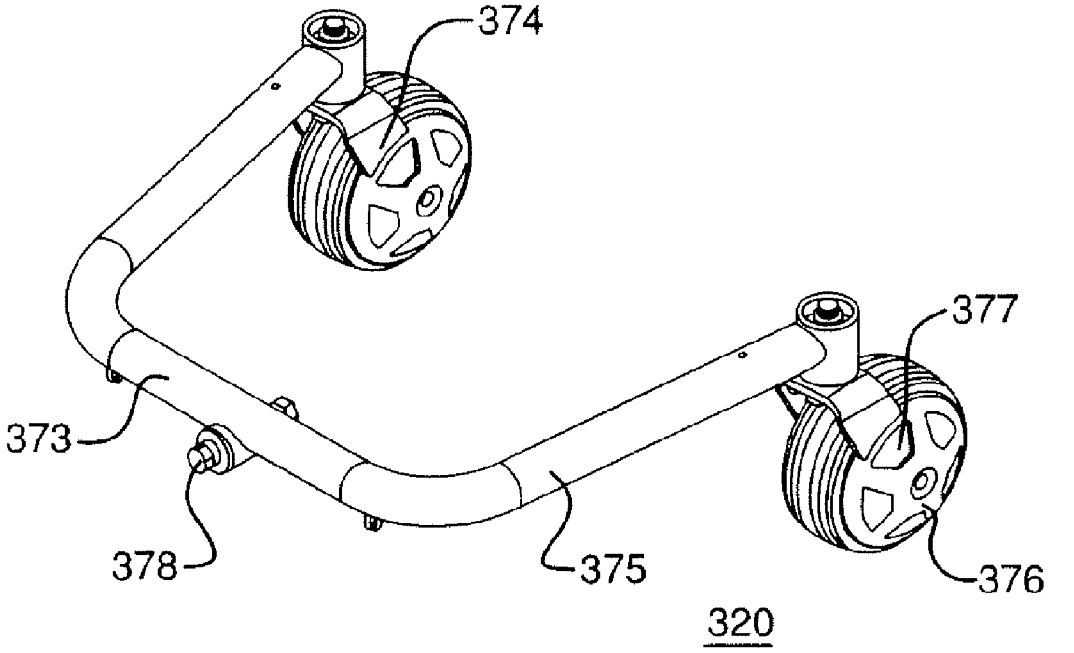
FIG. 33 is a perspective view of the articulating beam assembly of the wheelchair shown in FIG. 24.

Articulating beam assembly 320 includes a transverse member 373, legs 375, and a rear wheel assembly 377 as shown in FIG. 33. Transverse member is coupled to mounting plate 325*f* by a rotating joint 378 or any other means that enables articulating beam assembly 320 to adapt to changes in the ground, such as a pivot having a horizontal pivot axis. Preferably this pivot is located forward of battery compartment 326 and rearward of drive assembly 316. Legs 375 are coupled to each end of transverse member 373 and are positioned such that battery compartment 326 can be disposed between legs 375. Rear wheel assembly 377 includes a pair of swivel bearings 372, a pair of caster supports 374, and a pair of caster wheels 376. Bearings 372 are disposed on distal ends of legs 375, and each preferably includes a barrel that is vertically oriented to enable the corresponding caster wheel 376 to swivel or turn to enhance the capability of wheelchair 310 to turn. Caster support 374 includes a fork on which an axle or rearing of caster wheel 376 is fixed.

Transverse mounting of drives 350 enhances the ability to accomplish and configure the combination of generally rearward battery location and articulating beam assembly 370. For example, for conventional configurations having a motor that is perpendicular to the drive wheel axis (and requiring a right angle gearbox, which is not shown in the figures), the motor swings about the gearbox output shaft to impart motion to the front caster arm. Providing clearance for the swinging motion for such longitudinally mounted motors sacrifices space that may be used for locating the batteries. And because the articulating beam assembly also requires space for swinging (when, for example, only one rear caster is on a curb), configuring the combination of rear battery location and articulating beam assembly would be difficult if conventional, longitudinally mounted motors with right angle gearboxes would be employed.

The generally rearward position of battery compartment 326 and the configuration of articulating beam assembly 370 enables access to the batteries without fully removing seat 314. Whether seat 314 is moveable or is fixed, the configuration of wheelchair 310 enables batteries to be accessed from behind the drive wheels, and preferably from the rear center (that is, the 6 o'clock position when viewed from above). Accordingly, a technician may access the batteries while the wheelchair passenger remains in the seat. This function enables only one technician to make a sales call to a wheelchair owners home, rather than requiring additional people to help the driver from he seat. As the present invention generally encompasses structures in which the batteries are accessible from behind the drive wheels, no aspect of the present invention is limited to enabling access to the batteries as described herein, unless such limitation is expressly recited in the claim.

Support post 327, and preferably the connection between support post 327 and frame 324, is disposed rearward of drive motors 352, preferably generally rearward of drive assembly 316, and preferably rearward of the drive wheel axis of rotation C-DW. The connection between support post 327 and frame 324 may be the location at which the load from seat 314 and the passenger is transmitted to frame 324. Battery compartment 326 preferably is disposed substantially, and preferably entirely, rearward of drive wheel axis C-DW, and preferably substantially, and more preferably entirely, rearward of the support post 327 connection to frame 324. Also, the invention encompasses the center of gravity of batteries 382 or other power source being located rearward of the support 327 connection and/or rearward of drive wheel axis C-DW.

The loads borne by frame 324 are transmitted to the ground via drive wheels 358, front casters 366, and rear casters 376. As will be clear to people familiar with wheelchair design, the location of pivot 329 will affect the weight distribution of wheelchair 310. In this regard, the position of pivot 329 forward of drive wheel axis C-DW causes front casters 366 to bear a vertical load while wheelchair 310 is at rest, as mounting plate 356 is supported by drive wheel 358 via its axle. Configuring the wheelchair such that front casters 366 bear a vertical load during stead-speed operation on level ground and/or while at rest on level ground, may in some circumstances, enhance the stability and stable feel of a wheelchair, although load-bearing casters are not required. The position of pivot 329 may be chosen to achieve the desired weight distribution and the desired downward load borne by front casters 366. The weight distribution and magnitude of load borne by the casters may be chosen according to such parameters as desired stability of the particular wheelchair during operation on level ground and while ascending and descending a step, motor torque and horsepower, other wheelchair dimensions (such as the horizontal distance from drive wheel axis C-DW to the rear casters), overall wheelchair weight, and like parameters.

For the wheelchair 310 shown in FIGS. 24-28B, pivot axis 29 preferably is spaced apart from the front wheel axis by a horizontal dimension that is between 40% and 65%, more preferably between 45% and 60%, and even more preferably about 54% of the horizontal dimension between drive wheel axis C-DW and the front caster axis. Pivot axis 329 may be spaced apart from front wheel axis C-RC by less than or about 30% of the distance between the drive wheel axis and the front caster axis. Front casters 366 bear approximately 30% of the wheelchair load. A "horizontal" dimension or distance, when referring to pivot position, is measured parallel to a level ground plane in a direction of straight-ahead travel of the wheelchair (that is, perpendicular to the drive wheel axis) while the wheelchair is at rest. A "vertical" distance or dimension, or height, when referring to pivot position, is perpendicular to a level ground plane while the wheelchair is at rest.

Conventional wheelchairs having front casters often employ springs to bias the caster. The configuration of pivot assembly 318 enables the front suspension of wheelchair 310 to function without a spring bias on caster 366 because of the downward force applied to casters 366 described above. Forgoing biasing springs in the anti-tip wheels eliminates the step of adjusting spring bias for the weight of the wheelchair occupant. The present invention, however, is not limited to wheelchairs lacking springs, regardless of the type of front wheels employed.

Figure 31:
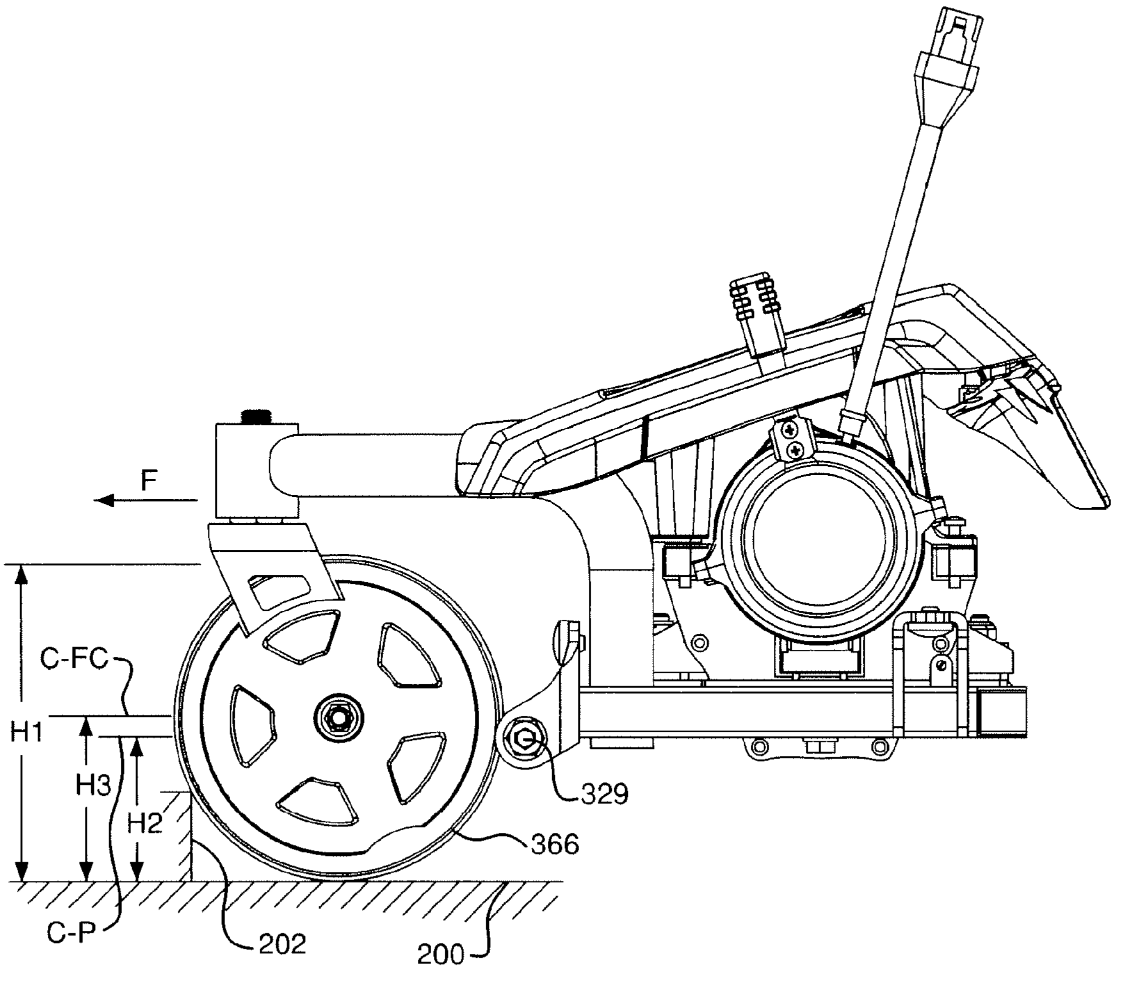
FIG. 31 is a side view of a portion of the front pivot assembly of the wheelchair shown in FIG. 24.

Referring to FIG. 31 to illustrate a preferred horizontal relationship of some components, drive wheel axis C-DW has a height H1, a centerline of pivot 329 defines a pivot axis C-P that as a height H2, and a centerline of front caster 366 defines a front caster axis C-FC that has a height H3. Preferably, front caster axis height H3 is approximately the same as or more than pivot axis height H2. The inventors believe that it is advantageous for pivot axis height H2 to be approximately below a line drawn between the drive wheel axis and axis of rotation of front caster 366.

The present invention encompasses a wheelchair having one or both of the vertical and horizontal pivot locations described herein, which will be referred in this and the following two paragraphs as a low pivot and a forward pivot, respectively. In general, low pivots may have been disfavored because of the need for clearance over the ground, even when the ground is uneven. Further, the pivot must clear an obstacle, such as a curb, during climbing, which may require lifting the frame at the pivot by a change in height that is greater than if the pivot was at a higher location. Further, considering lifting of the front pivot, forward pivot locations may have been disfavored because of diminished mechanical advantage of forward pivot positions.

For configurations in which the pivot axis C-P is below the caster axis C-FC, a force applied through the wheelchair via front caster 366 onto vertical obstacle face 202 creates an upward component of the force vector by the nature of the orientation of the pivots C-P and C-FC. This upward component of force may be helpful for ascending especially high obstacles, as explained above. The low pivot also aids even in circumstances in which the pivot axis C-P is at the same height or slightly higher than caster axis C-FC by keeping the downward component of the force near zero or small, such that motor torque may be used to climb the obstacle.

The configuration described herein, with any combination of low pivot, forward pivot, rigid coupling together of the drive assembly and front arm, transverse drives, and rear battery location provides a combination of beneficial wheelchair stability and curb climbing capabilities. The configuration shown naturally has good forward stability (that is, wheelchair 310 does not easily tip forward), and the articulating beam assembly enhances rearward stability (especially backwards tipping) compared with sprung rear arms.

Some aspects of the present invention depend on neither the low pivot nor the forward pivot, and the present invention should not be construed to require either or both a low pivot or forward pivot unless the structure is explicitly stated in the claim. Nor should the present invention be construed to require any other feature disclosed herein, even if the specification emphasizes its advantages, unless the structure is explicitly stated in the claim.

The description of wheelchair 310 and its respective subsystems is for illustration purposes, and the present invention is not intended to the particular descriptions provided herein, nor is the designation of parts into particular subsystems intended to limit the scope of the invention in any way. For example, the description of the frame assembly does not limit the scope of the invention to devices having a rigid frame, but rather the invention encompasses all frame structures, including those having flexible or movable structure; and describing components of the wheelchair as part of the pivot assembly is not intending to be limiting. Further, the frame structures, the chair assembly structure, the drive assembly structures, the pivot assembly structures, and articulating beam structures are described herein for illustration purposes, and are not intended to limit the scope of the invention except for the particular structure that is explicitly recited in the claim.

We claim:

1. A wheelchair comprising:

a frame including a seat post;

a pair of opposing drive wheels;

a pair of pivoting assemblies, each one of the pivoting assemblies including a drive assembly and a front arm assembly, each one of the pivoting assemblies being associated with one of the drive wheels and pivotally connected to the frame;

each drive assembly including a motor and gearbox that are transversely mounted relative to the frame and operatively coupled to one of the drive wheels;

a battery compartment formed on the frame and located rearward of the drive assemblies;

batteries located in the battery compartment; and an articulating beam assembly including a transverse member, pair of legs, and a pair of rear wheel assemblies, the legs extending generally rearwardly from opposing ends of the transverse member to the rear wheel assemblies, the transverse member being pivotally coupled to the seat post forward of the batteries;

whereby the battery compartment may be accessed from the rear of the wheelchair between the legs.

2. The wheelchair of claim 1 wherein the transverse member is generally parallel to the axis of rotation of the drive wheels.

3. The wheelchair of claim 1 wherein the articulating beam pivots about a substantially horizontal axis that is approximately perpendicular to the drive wheel axis of rotation.

4. The wheelchair of claim 1 wherein each one of the pivoting assemblies includes a front wheel that is an anti-tip wheel.

5. The wheelchair of claim 4 wherein the anti-tip wheel is suspended from a ground surface on which the wheelchair travels, the wheelchair further comprising a suspension capable of acting on the arm.

6. The wheelchair of claim 1 wherein the front wheel is a castor wheel that is normally in contact with the ground surface on which the wheelchair travels.

7. The wheelchair of claim 1 wherein a centerline of a pivot axis of the pivotal connection between the drive assembly and the frame has a vertical height that is approximately the same or less than the vertical height of an axis of rotation of the front wheel.

8. The wheelchair of claim 7 wherein the motor has a longitudinal axis that is transverse relative to the frame.

9. The wheelchair of claim 7 wherein the drive assembly includes a mount to which the gearbox is affixed, the mount including a surface to which the front arm is rigidly affixed.

10. The wheelchair of claim 9 wherein the mounting is a vertical plate.

11. The wheelchair of claim 1 wherein the gearbox is a single reduction gearbox.

12. A method of accessing batteries of a power wheelchair, comprising the steps of:

a) providing a wheelchair that includes:

a frame including a seat post;

a pair of opposing drive wheels;

a pair of pivoting assemblies, each one of the pivoting assemblies: (i) including a drive assembly and a front arm assembly, (ii) associated with one of the drive wheels, and (iii) pivotally connected to the frame;

each drive assembly including a motor and gearbox that are transversely mounted relative to the frame and operatively coupled to one of the drive wheels;

a battery compartment formed on the frame and located rearward of the drive assemblies; batteries located in the battery compartment; and an articulating beam assembly including a transverse member, pair of legs, and a pair of rear wheel assemblies, the legs extend generally rearwardly from opposing ends of the transverse member to the rear wheel assemblies, the transverse member being pivotally coupled to the seat post forward of the batteries; and b) accessing the batteries from the rear of the wheelchair between legs.

13. The method of claim 12 wherein the transverse member is generally parallel to the axis of rotation of the drive wheels.

14. A wheelchair comprising:

a frame;

a pair of opposing drive wheels;

a pair of pivoting assemblies, each one of the pivoting assemblies including a drive assembly and a front arm assembly, each one of the pivoting assemblies being associated with one of the drive wheels and pivotally connected to the frame;

each drive assembly including a motor, a gearbox, and a vertical plate to which the gearbox is affixed, the vertical plate including a surface to which the front arm is rigidly affixed;

a battery compartment formed on the frame and located rearward of the drive assemblies;

batteries located in the battery compartment; and an articulating beam assembly including a transverse member, pair of legs, and a pair of rear wheel assemblies, the legs extending generally rearwardly from opposing ends of the transverse member to the rear wheel assemblies, the transverse member being pivotally coupled to the frame forward of the batteries;

wherein (i) each motor and gearbox is transversely mounted relative to the frame and operatively coupled to one of the drive wheels, (ii) a centerline of a pivot axis of the pivotal connection between the drive assembly and the frame has a vertical height that is approximately the same or less than the vertical height of an axis of rotation of the front wheel, and (iii) the battery compartment may be accessed from the rear of the wheelchair between the legs.

15. The wheelchair of claim 14, wherein the frame comprises a seat post that is forward of the battery compartment, the transverse member of the articulating beam being pivotally connected to the seat post.

16. The wheelchair of claim 14, wherein the articulating beam pivots about a substantially horizontal axis that is approximately perpendicular to the drive wheel axis of rotation.

17. The wheelchair of claim 14, wherein each one of the pivoting assemblies includes a front wheel that is an anti-tip wheel.

18. The wheelchair of claim 17, wherein the anti-tip wheel is suspended from a ground surface on which the wheelchair travels, the wheelchair further comprising a suspension capable of acting on the arm.

19. The wheelchair of claim 14, wherein the front wheel is a castor wheel that is normally in contact with the ground surface on which the wheelchair travels.

20. The wheelchair of claim 14, wherein the motor has a longitudinal axis that is transverse relative to the frame.

21. The wheelchair of claim 14, wherein the gearbox is a single reduction gearbox.

22. A wheelchair comprising:

a frame including a seat post;

a pair of opposing drive wheels;

a pair of pivoting assemblies, each one of the pivoting assemblies including a drive assembly and a front arm assembly, each one of the pivoting assemblies being associated with one of the drive wheels and pivotally connected to the frame;

each drive assembly including a motor and gearbox that are mounted to the frame and operatively coupled to one of the drive wheels;

a battery compartment formed on the frame and located rearward of the seat post;

batteries for powering the motors; and an articulating beam assembly including a transverse member, pair of legs, and a pair of rear wheel assemblies, the legs extending generally rearwardly from opposing ends of the transverse member to the rear wheel assemblies, the transverse member being pivotally coupled to the frame proximate to the seat post and forward of the battery compartment;

wherein (i) the batteries for powering the motors are all located in the battery compartment that is rearward of the drive assemblies, and (ii) the batteries for powering the motors may all be accessed from the rear of the wheelchair between the legs.

23. The wheelchair of claim 22, wherein the transverse member is pivotally connected to the seat post.

* * * * *